(12) United States Patent
Huang et al.

(10) Patent No.: US 11,944,973 B2
(45) Date of Patent: Apr. 2, 2024

(54) NON-POISSONIAN DROPLET PARTITIONING USING FEEDBACK

(71) Applicant: Sharp Life Science (EU) Limited, Oxford (GB)

(72) Inventors: Laura Huang, Oxford (GB); Benjamin James Hadwen, Oxford (GB); Adam Christopher Wilson, Oxford (GB)

(73) Assignee: Sharp Life Science (EU) Limited, Uxbridge (GB)

( * ) Notice: Subject to any disclaimer, the term of this patent is extended or adjusted under 35 U.S.C. 154(b) by 263 days.

(21) Appl. No.: 17/396,819

(22) Filed: Aug. 9, 2021

(65) Prior Publication Data
US 2021/0362160 A1    Nov. 25, 2021

Related U.S. Application Data

(62) Division of application No. 16/242,078, filed on Jan. 8, 2019, now Pat. No. 11,117,134.

(51) Int. Cl.
*B01L 3/00* (2006.01)
*G01N 15/1031* (2024.01)
(Continued)

(52) U.S. Cl.
CPC ... *B01L 3/502792* (2013.01); *B01L 3/502746* (2013.01); *G01N 15/1031* (2013.01);
(Continued)

(58) Field of Classification Search
CPC .......... B01L 3/502792; B01L 2200/06; B01L 2200/061; B01L 2400/0427;
(Continued)

(56) References Cited

U.S. PATENT DOCUMENTS

| 7,163,612 B2 | 1/2007 | Sterling et al. |
| 7,901,947 B2 | 3/2011 | Pollack et al. |

(Continued)

FOREIGN PATENT DOCUMENTS

| WO | WO 2017046565 | 3/2017 |
| WO | WO 2018119447 | 6/2018 |

OTHER PUBLICATIONS

Fair, R.B., "Digital microfluids: is a true lab-on-a-chip possible?" Microfluidics and Nanofluidics Jun. 2007, vol. 3, Issue 3, pp. 245-281.
(Continued)

*Primary Examiner* — Christine T Mui
(74) *Attorney, Agent, or Firm* — Renner, Otto, Boisselle & Sklar, LLP

(57) ABSTRACT

A microfluidic device performs a method of partitioning droplets from a fluid reservoir containing particles that provides a non-Poissonian distribution of dispensed droplets containing a desired number of particles. Using an electrowetting on dielectric (EWOD) device, droplets are dispensed having a Poissonian distribution of dispensed droplets containing a desired number of particles, and the droplets are interrogated to determine whether each dispensed droplet has a desired number of particles. Droplets that contain the desired number of particles are moved by EWOD operation to a reaction area on the EWOD device, and droplets that do not contain the desired number of particles are rejected and moved by EWOD operation to a holding area on the EWOD device that is different and spaced apart from the reaction area. The result is that
(Continued)

droplets in the reaction area have a non-Poissonian distribution of droplets containing the desired number of particles.

9 Claims, 16 Drawing Sheets

(51) Int. Cl.
    *G01N 15/14* (2006.01)
    *G01N 15/10* (2006.01)
(52) U.S. Cl.
    CPC ...... *G01N 15/1484* (2013.01); *B01L 2200/06* (2013.01); *B01L 2200/061* (2013.01); *B01L 2400/0427* (2013.01); *B01L 2400/084* (2013.01); *G01N 2015/1043* (2013.01); *G01N 2015/1481* (2013.01); *G01N 2015/1486* (2013.01)
(58) Field of Classification Search
    CPC ........... G01N 15/1031; G01N 15/1484; G01N 2015/1043; G01N 2015/1481; G01N 2015/1486
    USPC .................................................. 422/504, 500
    See application file for complete search history.

(56) References Cited

U.S. PATENT DOCUMENTS

| | | |
|---|---|---|
| 8,173,000 B1 | 5/2012 | Hadwen et al. |
| 8,653,832 B2 | 2/2014 | Hadwen et al. |
| 8,809,068 B2 | 8/2014 | Sista et al. |
| 9,476,856 B2 | 10/2016 | Pamula et al. |
| 2015/0204858 A1* | 7/2015 | Debski ............... G01N 33/5306 435/6.12 |
| 2017/0056887 A1 | 3/2017 | Hadwen et al. |
| 2017/0076676 A1 | 3/2017 | Hadwen |
| 2018/0078934 A1 | 3/2018 | Hadwen et al. |
| 2018/0135117 A1 | 5/2018 | Link |

OTHER PUBLICATIONS

Cho et al., "Concentration and binary separation of micro particles for droplet-based digital microfluidics", The Royal Society of Chemistry, vol. 7, pp. 490-498, 2007 www.rsc.org/loc. DOI: 10.1039/b615665g.

Edd et al.: "Controlled Encapsulation of Single-Cells into Monodisperse Picolitre Drops", Lab on a Chip, 2008, 8, 1262-1264.

* cited by examiner

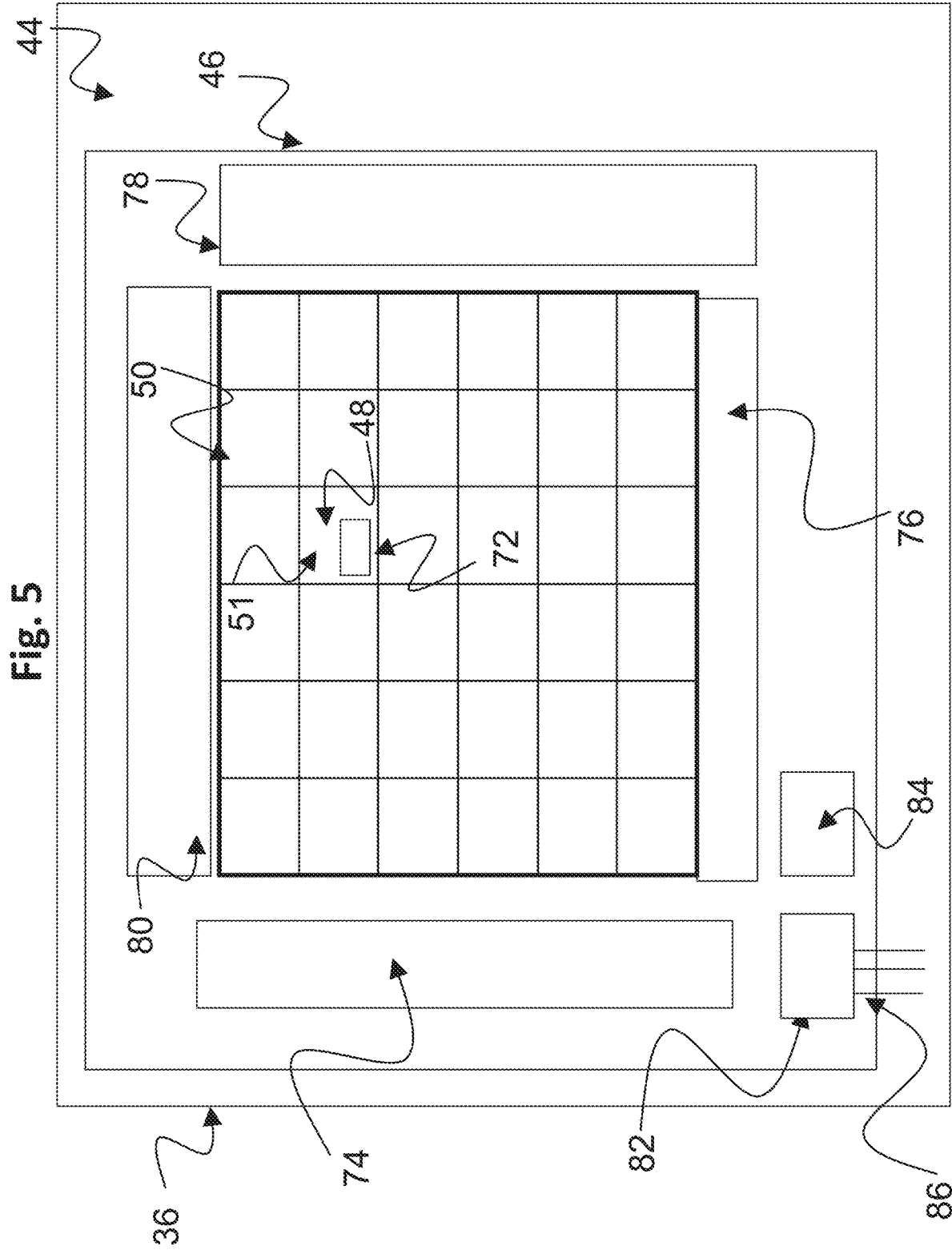

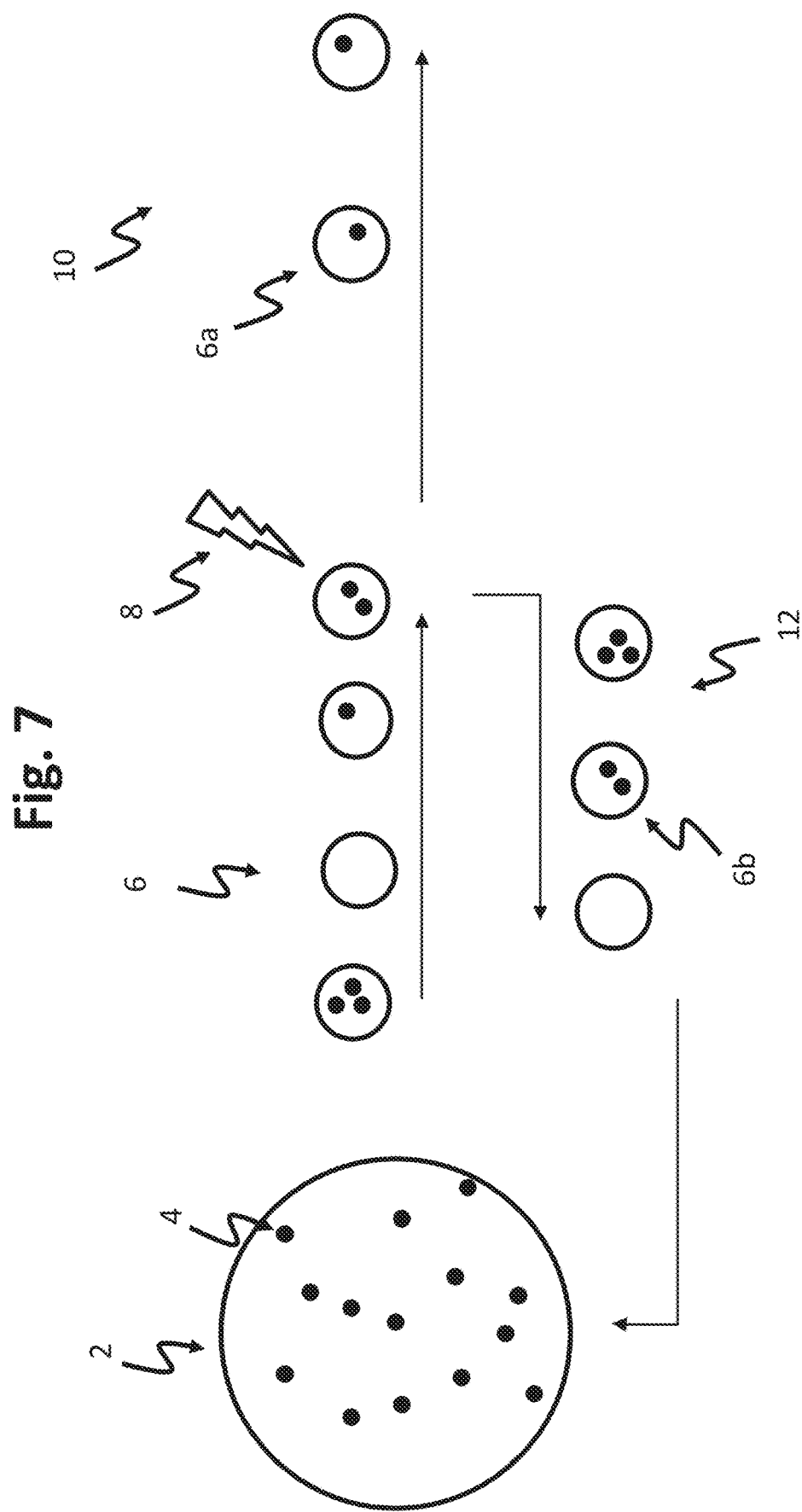

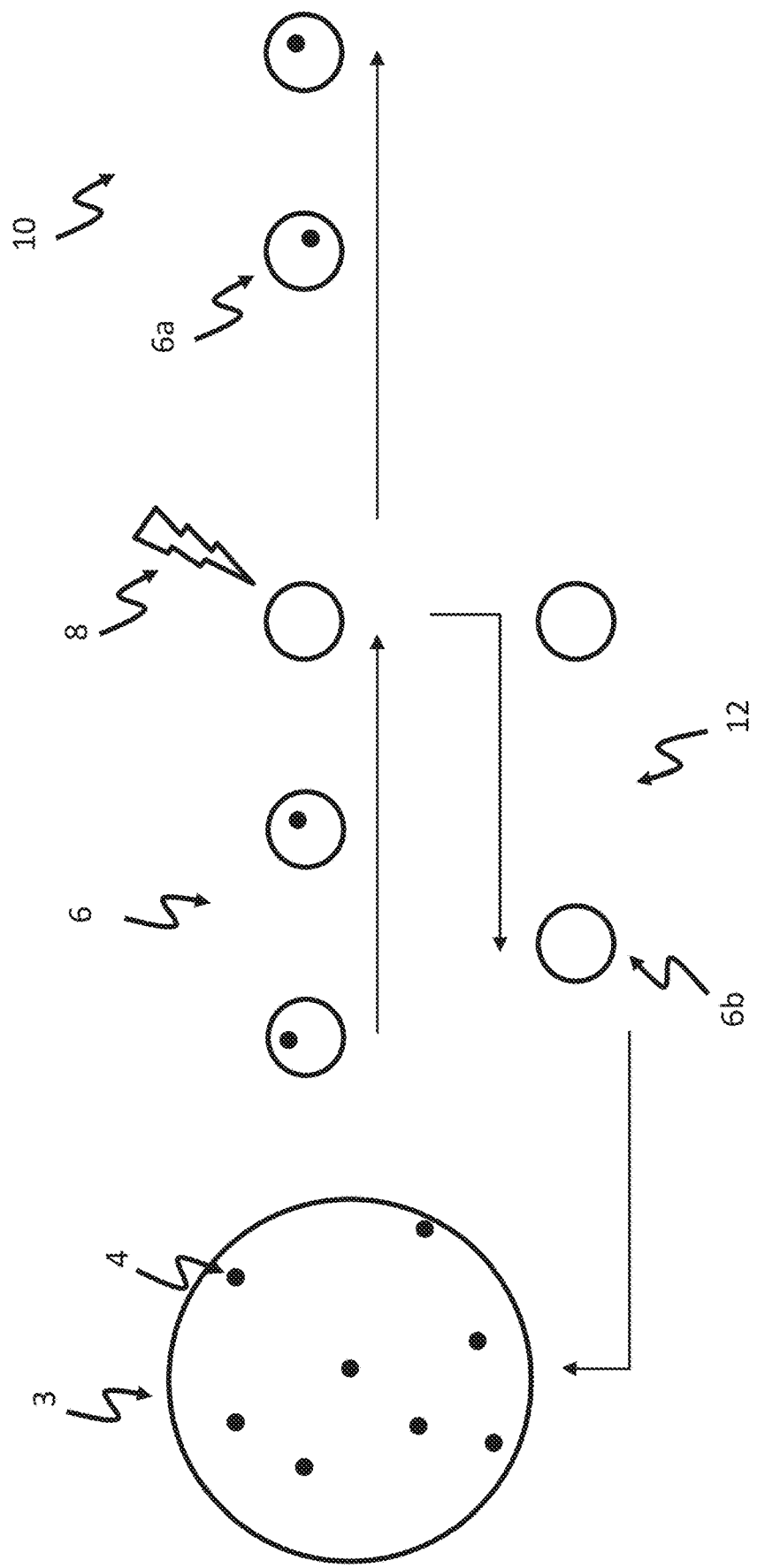

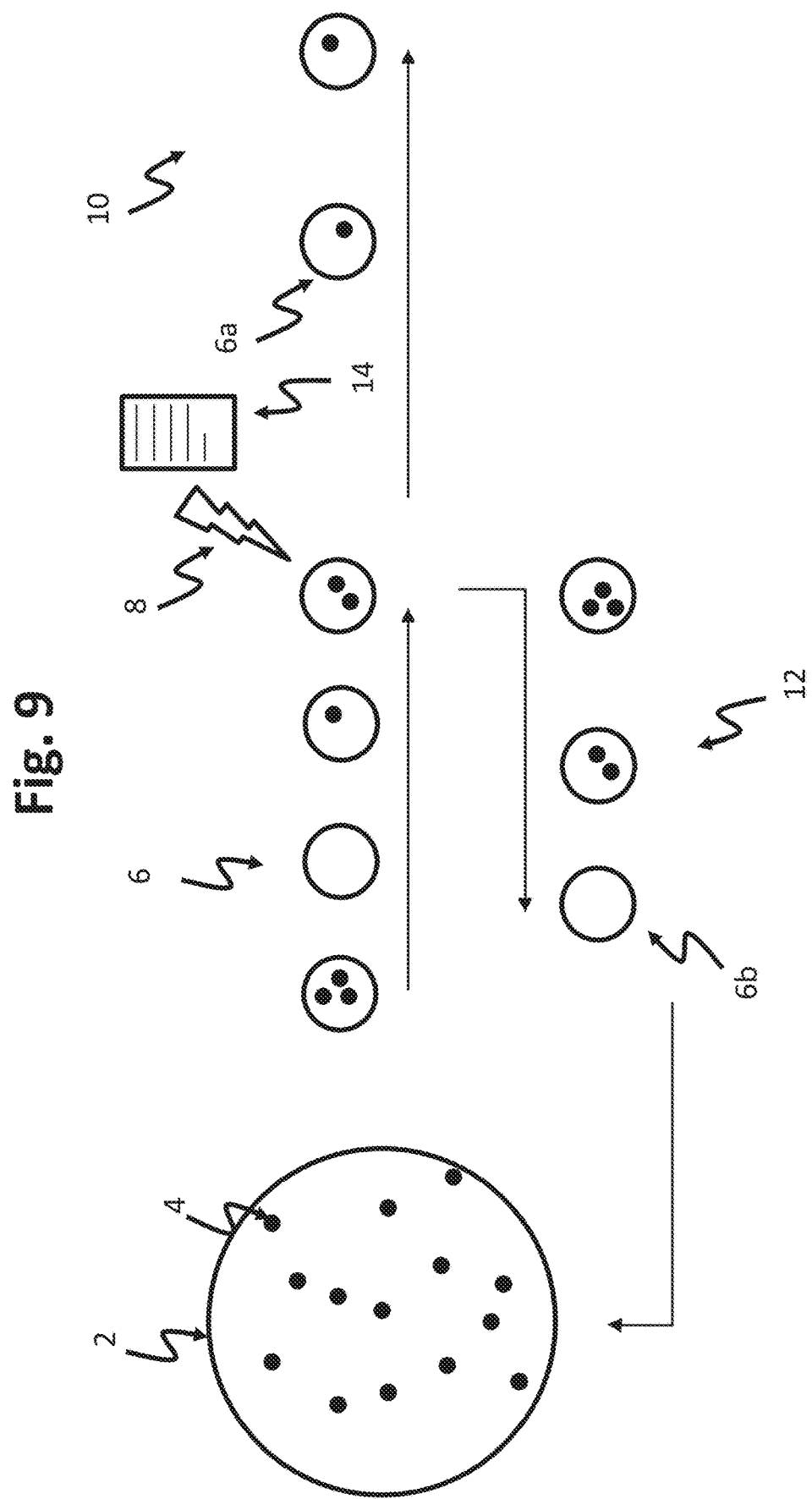

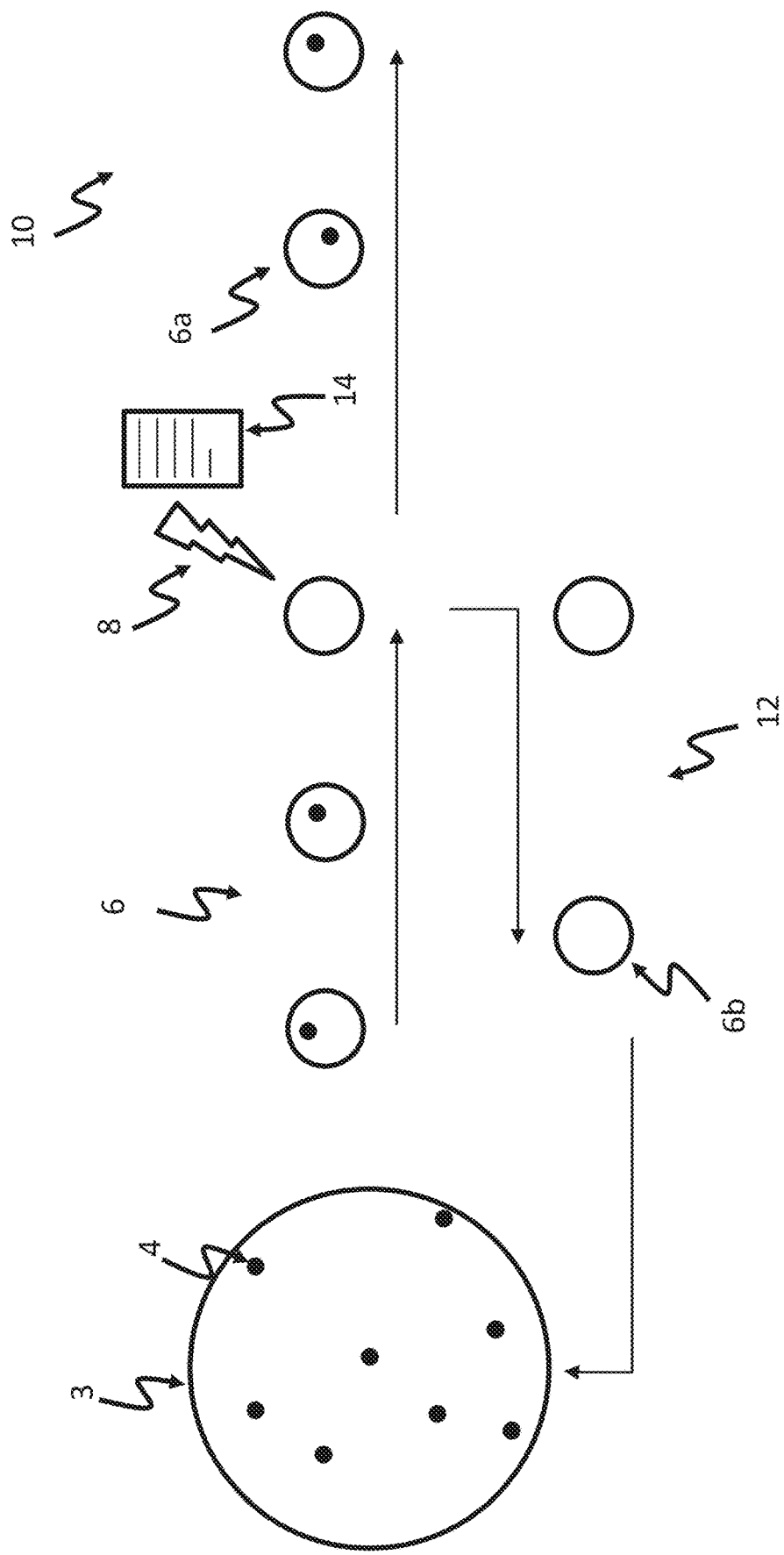

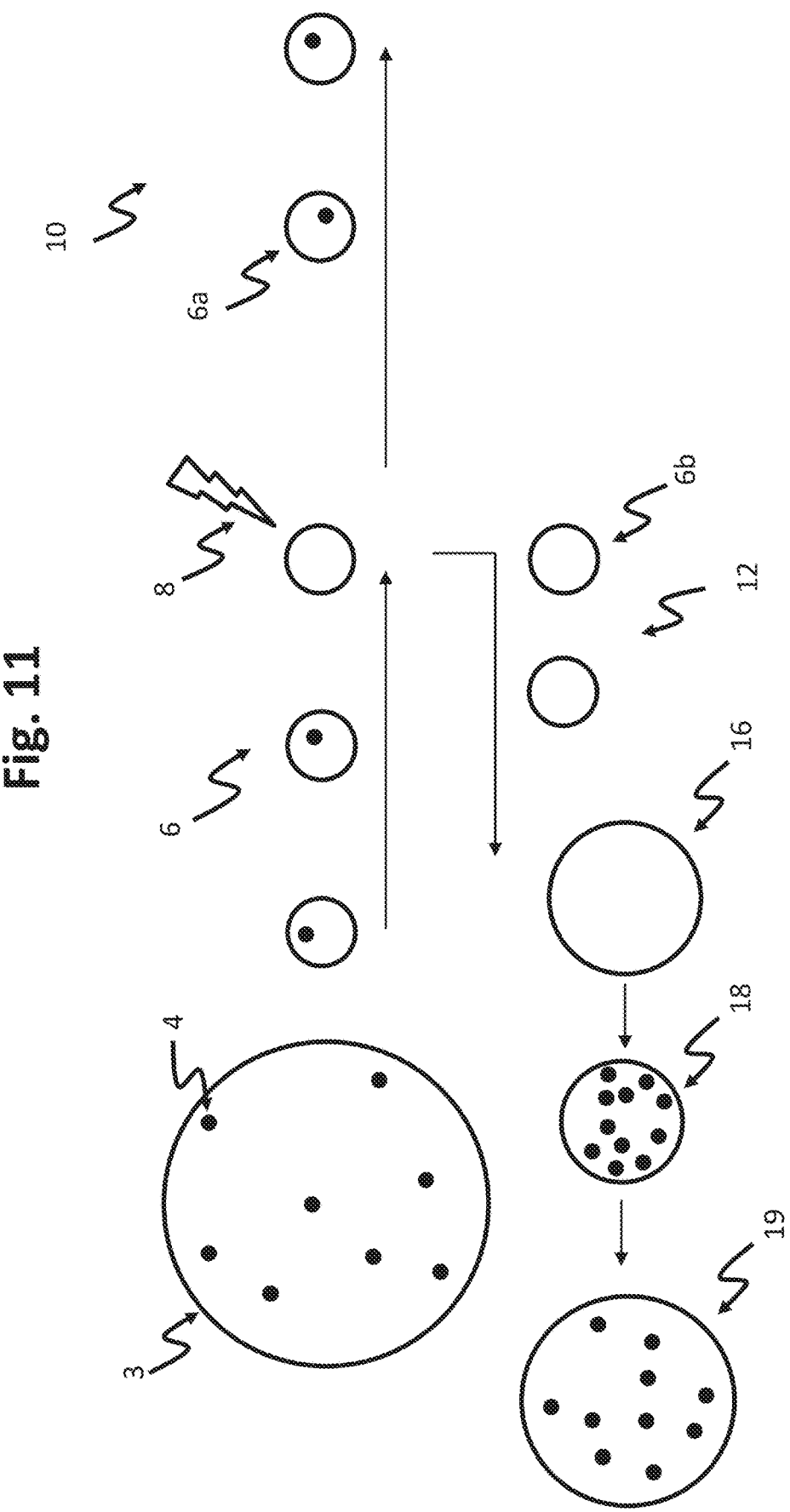

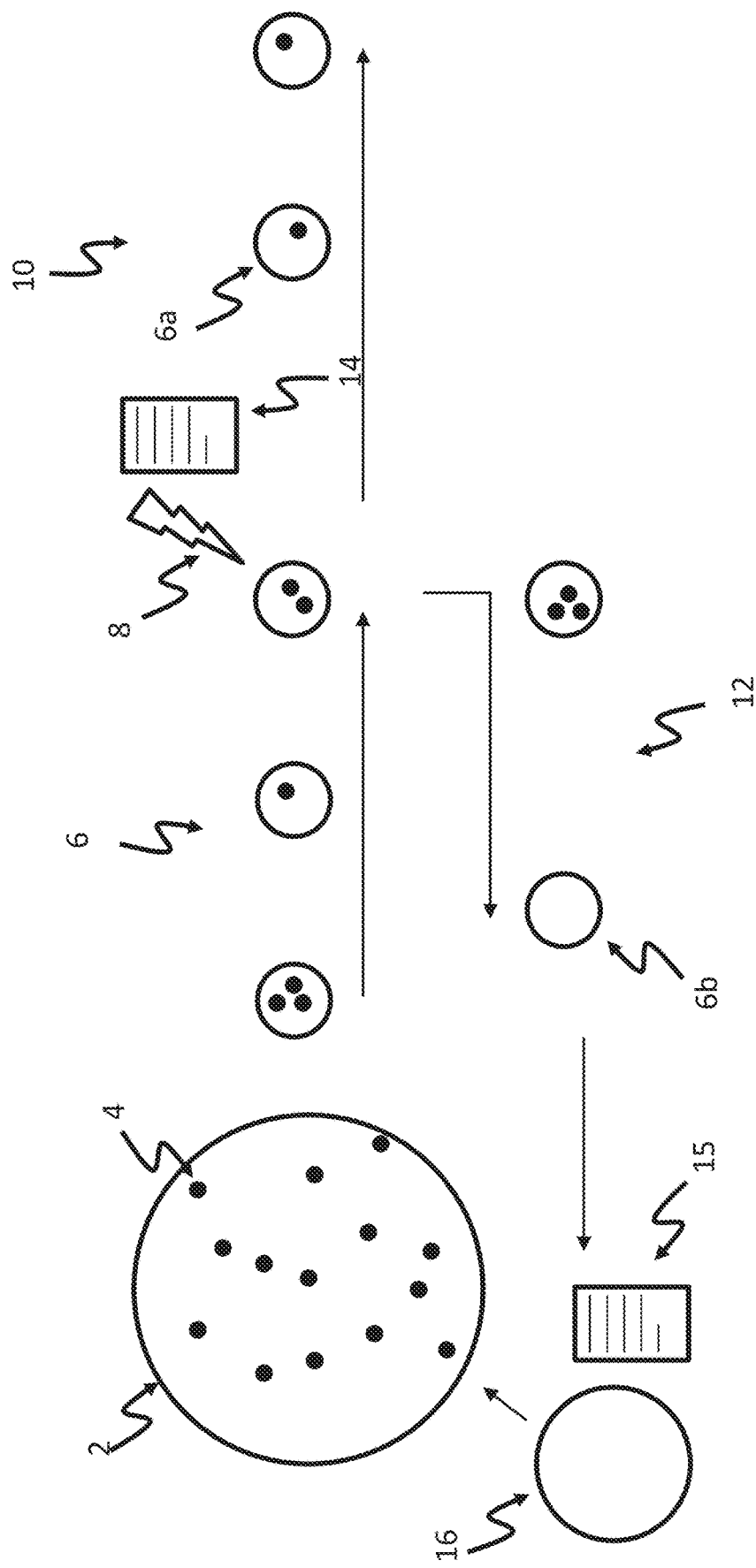

NON-POISSONIAN DROPLET PARTITIONING USING FEEDBACK

RELATED APPLICATIONS

The present application is a divisional application of U.S. application Ser. No. 16/242,078 filed on Jan. 8, 2019, the contents of which are incorporated here by reference.

TECHNICAL FIELD

The present invention relates to droplet microfluidic devices, and more specifically to Active Matrix Electrowetting-On-Dielectric (AM-EWOD) devices, and to methods of operating such devices for partitioning or encapsulation of particles into droplets on AM-EWOD devices.

BACKGROUND ART

Electrowetting on dielectric (EWOD) is a well-known technique for manipulating droplets of fluid by application of an electric field. Active Matrix EWOD (AM-EWOD) refers to implementation of EWOD in an active matrix array incorporating transistors, for example by using thin film transistors (TFTs). It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 is a drawing depicting an exemplary EWOD based microfluidic system. In the example of FIG. 1, the microfluidic system includes a reader 32 and a cartridge 34. The cartridge 34 may contain a microfluidic device, such as an AM-EWOD device 36, as well as (not shown) fluid input ports into the device and an electrical connection as are conventional. The fluid input ports may perform the function of inputting fluid into the AM-EWOD device 36 and generating droplets within the device, for example by dispensing from input reservoirs as controlled by electrowetting. As further detailed below, the microfluidic device includes an electrode array configured to receive the inputted fluid droplets.

The microfluidic system further may include a control system configured to control actuation voltages applied to the electrode array of the microfluidic device to perform manipulation operations to the fluid droplets. For example, the reader 32 is electrically connected to the cartridge 34 by electrical lines 42, and the reader 32 may contain such a control system configured as control electronics 38 and a storage device 40 that may store any application software and any data associated with the system. The control electronics 38 may include suitable circuitry and/or processing devices that are configured to carry out various control operations relating to control of the AM-EWOD device 36, such as a CPU, microcontroller or microprocessor.

In the example of FIG. 1, an external sensor module 35 is provided for sensor droplet properties. For example, optical sensors as are known in the art may be employed as external sensors for sensing droplet properties, which may be incorporated into a probe that can be located in proximity to the EWOD device. Suitable optical sensors include camera devices, light sensors, charged coupled devices (CCD) and similar image sensors, and the like. A sensor additionally or alternatively may be configured as internal sensor circuitry incorporated as part of the drive circuitry in each array element. Such sensor circuitry may sense droplet properties by the detection of an electrical property at the array element, such as impedance or capacitance.

FIG. 2 is a drawing depicting additional details of the exemplary AM-EWOD device 36 in a perspective view. The AM-EWOD device 36 has a lower substrate assembly 44 with thin film electronics 46 disposed upon the lower substrate assembly 44. The thin film electronics 46 are arranged to drive array element electrodes 48. A plurality of array element electrodes 48 are arranged in an electrode or element two-dimensional array 50, having N rows by M columns of array elements where N and M may be any integer. A liquid droplet 52 which may include any polar liquid and which typically may be aqueous, is enclosed between the lower substrate 44 and a top substrate 54 separated by a spacer 56, although it will be appreciated that multiple liquid droplets 52 can be present.

FIG. 3 is a drawing depicting a cross section through some of the array elements of the exemplary AM-EWOD 36 device of FIG. 2. In the portion of the AM-EWOD device depicted in FIG. 3, the device includes a pair of the array element electrodes 48A and 48B that are shown in cross section that may be utilized in the electrode or element array 50 of the AM-EWOD device 36 of FIG. 3. The AM-EWOD device 36 further incorporates the thin-film electronics 46 disposed on the lower substrate 44, which is separated from the upper substrate 54 by the spacer 56. The uppermost layer of the lower substrate 44 (which may be considered a part of the thin film electronics layer 46) is patterned so that a plurality of the array element electrodes 48 (e.g. specific examples of array element electrodes are 48A and 48B in FIG. 3) are realized. The term element electrode 48 may be taken in what follows to refer both to the physical electrode structure 48 associated with a particular array element, and also to the node of an electrical circuit directly connected to this physical structure. A reference electrode 58 is shown in FIG. 3 disposed upon the top substrate 54, but the reference electrode alternatively may be disposed upon the lower substrate 44 to realize an in-plane reference electrode geometry. The term reference electrode 58 may also be taken in what follows to refer to both or either of the physical electrode structure and also to the node of an electrical circuit directly connected to this physical structure.

In the AM-EWOD device 36, a non-polar fluid 60 (e.g. oil) may be used to occupy the volume not occupied by the liquid droplet 52. An insulator layer 62 may be disposed upon the lower substrate 44 that separates the conductive element electrodes 48A and 48B from a first hydrophobic coating 64 upon which the liquid droplet 52 sits with a contact angle 66 represented by θ. The hydrophobic coating is formed from a hydrophobic material (commonly, but not necessarily, a fluoropolymer). On the top substrate 54 is a second hydrophobic coating 68 with which the liquid droplet 52 may come into contact. The reference electrode 58 is interposed between the top substrate 54 and the second hydrophobic coating 68.

The contact angle θ for the liquid droplet is defined as shown in FIG. 3, and is determined by the balancing of the surface tension components between the solid-liquid ($\gamma_{SL}$), liquid-gas ($\gamma_{LG}$) and non-ionic fluid ($\gamma_{SG}$) interfaces, and in the case where no voltages are applied satisfies Young's law, the equation being given by:

$$\cos\theta = \frac{\gamma_{SG} - \gamma_{SL}}{\gamma_{LG}} \qquad \text{(equation 1)}$$

In operation, voltages termed the EW drive voltages, (e.g. $V_T$, $V_O$ and $V_{00}$ in FIG. 3) may be externally applied to different electrodes (e.g. reference electrode 58, element electrodes 48A and 48A, respectively). The resulting electrical forces that are set up effectively control the hydrophobicity of the hydrophobic coating 64. By arranging for different EW drive voltages (e.g. $V_O$ and $V_{00}$) to be applied to different element electrodes (e.g. 48A and 48B), the liquid droplet 52 may be moved in the lateral plane between the two substrates.

FIG. 4A shows a circuit representation of the electrical load 70A between the element electrode 48 and the reference electrode 58 in the case when a liquid droplet 52 is present. The liquid droplet 52 can usually be modeled as a resistor and capacitor in parallel. Typically, the resistance of the droplet will be relatively low (e.g. if the droplet contains ions) and the capacitance of the droplet will be relatively high (e.g. because the relative permittivity of polar liquids is relatively high, e.g. ~80 if the liquid droplet is aqueous). In many situations the droplet resistance is relatively small, such that at the frequencies of interest for electrowetting, the liquid droplet 52 may function effectively as an electrical short circuit. The hydrophobic coatings 64 and 68 have electrical characteristics that may be modelled as capacitors, and the insulator 62 may also be modelled as a capacitor. The overall impedance between the element electrode 48 and the reference electrode 58 may be approximated by a capacitor whose value is typically dominated by the contribution of the insulator 62 and hydrophobic coatings 64 and 68 contributions, and which for typical layer thicknesses and materials may be on the order of a pico-Farad in value.

FIG. 4B shows a circuit representation of the electrical load 70B between the element electrode 48 and the reference electrode 58 in the case when no liquid droplet is present. In this case the liquid droplet components are replaced by a capacitor representing the capacitance of the non-polar fluid 60 which occupies the space between the top and lower substrates. In this case the overall impedance between the element electrode 48 and the reference electrode 58 may be approximated by a capacitor whose value is dominated by the capacitance of the non-polar fluid and which is typically small, on the order of femto-Farads.

For the purposes of driving and sensing the array elements, the electrical load 70A/70B overall functions in effect as a capacitor, whose value depends on whether a liquid droplet 52 is present or not at a given element electrode 48. In the case where a droplet is present, the capacitance is relatively high (typically of order pico-Farads), whereas if there is no liquid droplet present the capacitance is low (typically of order femto-Farads). If a droplet partially covers a given electrode 48 then the capacitance may approximately represent the extent of coverage of the element electrode 48 by the liquid droplet 52.

U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in active matrix display technologies. The approach of U.S. Pat. No. 7,163,612 may be termed "Active Matrix Electrowetting on Dielectric" (AM-EWOD). There are several advantages in using TFT based thin film electronics to control an EWOD array, namely:

Electronic driver circuits can be integrated onto the lower substrate.

TFT-based thin film electronics are well suited to the AM-EWOD application. They are cheap to produce so that relatively large substrate areas can be produced at relatively low cost.

TFTs fabricated in standard processes can be designed to operate at much higher voltages than transistors fabricated in standard CMOS processes. This is significant since many EWOD technologies require electrowetting voltages in excess of 20V to be applied.

FIG. 5 is a drawing depicting an exemplary arrangement of thin film electronics 46 in the exemplary AM-EWOD device 36 of FIG. 2. The thin film electronics 46 is located upon the lower substrate 44. Each array element 51 of the array of elements 50 contains an array element circuit 72 for controlling the electrode potential of a corresponding element electrode 48. Integrated row driver 74 and column driver 76 circuits are also implemented in thin film electronics 46 to supply control signals to the array element circuit 72. The array element circuit 72 may also contain a sensor capability for detecting the presence or absence of a liquid droplet in the location of the array element. Integrated sensor row addressing 78 and column detection circuits 80 may further be implemented in thin film electronics for the addressing and readout of the sensor circuitry in each array element.

A serial interface 82 may also be provided to process a serial input data stream and facilitate the programming of the required voltages to the element electrodes 48 in the array 50. A voltage supply interface 84 provides the corresponding supply voltages, top substrate drive voltages, and other requisite voltage inputs as further described herein. A number of connecting wires 86 between the lower substrate 44 and external control electronics, power supplies and any other components can be made relatively few, even for large array sizes. Optionally, the serial data input may be partially parallelized. For example, if two data input lines are used the first may supply data for columns 1 to X/2, and the second for columns (1+X/2) to M with minor modifications to the column driver circuits 76. In this way the rate at which data can be programmed to the array is increased, which is a standard technique used in liquid crystal display driving circuitry.

FIG. 6 is a drawing depicting an exemplary arrangement of the array element circuit 72 present in each array element 51, which may be used as part of the thin film electronics of FIG. 5. The array element circuit 72 may contain an actuation circuit 88, having inputs ENABLE, DATA and ACTUATE, and an output which is connected to an element electrode 48. The array element circuit 72 also may contain a droplet sensing circuit 90, which may be in electrical communication with the element electrode 48. Typically, the read-out of the droplet sensing circuit 90 may be controlled by one or more addressing lines (e.g. RW) that may be common to elements in the same row of the array, and may also have one or more outputs, e.g. OUT, which may be common to all elements in the same column of the array.

The array element circuit 72 may typically perform the functions of:
Selectively actuating the element electrode 48 by supplying a voltage to the array element electrode. Accordingly, any liquid droplet present at the array element 51 may be actuated or de-actuated by the electro-wetting effect.
(ii) Sensing the presence or absence of a liquid droplet at the location of the array element 51. The means of sensing may be capacitive or impedance, optical, thermal or some other means. Capacitive or impedance sensing may be employed conveniently and effectively using an integrated impedance sensor circuit as part of the array element circuitry.

Various methods of controlling an AM-EWOD device to sense droplets and perform desired droplet manipulations have been described. For example, US 2017/0056887 (Hadwen et al., published Mar. 2, 2017) describes the use of capacitance detection to sense dynamic properties of reagents as a way for determining the output of an assay. Such disclosure incorporates an integrated impedance sensor circuit that is incorporated specifically into the array element circuitry of each array element. Accordingly, attempts have been made to optimize integrated impedance sensing circuitry into the array element structure, and in particular as part of the array element circuitry. Examples of AM-EWOD devices having integrated actuation and sensing circuits are described, for example, in Applicant's commonly assigned patent documents as follows: U.S. Pat. No. 8,653,832 (Hadwen et al., issued Feb. 18, 2014); US 2018/0078934 (Hadwen et al., published Mar. 22, 2018); US 2017/0076676 (Hadwen, published Mar. 16, 2017); and U.S. Pat. No. 8,173,000 (Hadwen et al., issued May 8, 2012). The enhanced method of operation described in the current application may be employed in connection with any suitable array element circuitry.

AM-EWOD droplet manipulation devices are a highly desirable platform for, automation of chemical/biochemical reactions. Reaction protocols often include dispensing sample droplets from sample reservoirs by performing a number of serial dilutions and end point analyses until an optimum concentration of a target species, such as a particle of interest, is reached in each sample droplet. The number of particles in each sample droplet is a discrete number (0, 1, 2, 3, 4 . . . ), and many reaction protocols are operated preferably with only a single target particle in each sample droplet.

When the number of dispensed droplets is large, then the binomial distribution that describes the discrete probability distribution that a given droplet contains a particular number of target particles (e.g. one particle) may be approximated by the Poisson distribution. Based on Poisson statistics, there will be a distribution of particle concentrations in the dispensed sample droplets. Many of the droplets, therefore, may contain an unfavorable number of particles for further downstream processes and may therefore occupy space that is unusable for other processes. Accordingly, various attempts have been made to develop microfluidic systems that generate a non-Poissonian distribution of sample droplets to maximize the number of sample droplets having the desired number of target particles.

For example, WO 2018/119447 (Belgrader et al., published Jun. 28, 2018) discloses a flow microfluidics system for cells in which the flows are controlled so as to present a non-Poissonian distribution of single occupied partitions while providing lower levels of unoccupied partitions. WO 2017/046565 (Li et al., published Mar. 23, 2017) discloses a flow microfluidics structure having a comb of inlets that spaces out the entities in suspension, and thereby improves on a Poisson distribution. "Controlled Encapsulation of Single-Cells Into Monodisperse Picolitre Drops" (Edd et al., Lab on a Chip, 2008, 8, 1262-1264) describes the use of a high aspect ratio microchannel to cause the cells to self-organize into evenly-spaced streams. If droplets are created at the same frequency as (or higher than) that at which the particles reach the droplet generator, then more single particle droplets and fewer empty droplets are produced than Poisson statistics would predict. US 2018/0135117 (Darren, published May 17, 2018) describes a flow microfluidic device that contains a detection module and a sorting module. The results of the detection module will determine whether the droplet is sorted into a collection module or a waste module.

The above microfluidic systems generally do not employ actuation of AM-EWOD arrays to generate the droplet partitioning. Such systems, therefore, may be bulky, difficult to operate, and otherwise do not substantially reduce reagent usage in an efficient manner.

SUMMARY OF INVENTION

The use of an AM-EWOD device to generate a non-Poissonian distribution of sample droplets partitioned from an input fluid reservoir has not been effectively developed in connection with conventional microfluidic systems. The present invention pertains to systems and methods of operating an AM-EWOD device that uses detection and feedback to dispense sample droplets having a desired number of particles, and a single particle in particular, more reliably and at a fixed concentration, which may be more or less than the original reservoir concentration. Droplets on an electrowetting on dielectric (EWOD) device array are dispensed from a reservoir containing particles of interest. A particle, for example, may be a physical particle such as a bead (latex, paramagnetic, colloidal gold) or a cell (prokaryotic or eukaryotic), or may also be some other element such as a protein or a nucleic acid that may be considered a "discrete" entity that could be separated from an aggregate or mixture.

Natively, the number of particles likely to be present in any dispensed droplet is governed by Poisson statistics and thus is not consistent across several dispensed droplets. In accordance with the various embodiments, each droplet may be detected by some means, for example, by optical or electrical interrogation, and the number of particles within each droplet is determined by suitable characterization (e.g., zero or more than zero; or zero, one, or more than one, or the like). Selected droplets that contain the desired number of particles are routed into a reaction area on the device array, while rejected droplets that do not contain the desired number of particles are directed to a holding area of the device array that is different and spaced apart from the reaction area. From the holding area, rejected droplets may be handled in a variety of ways. For example, rejected droplets may be directly routed back into the original reservoir, or held in a location separate from the reaction area until it is desirable to re-introduce the rejected droplets back into the reservoir. The rejected droplets may thus be recycled, and the process of dispensing droplets can be continued until the required number of selected droplets containing a desired number of particles (e.g. one particle) is created or until the reservoir can no longer dispense droplets that contain the desired number of particles. The more accurate the process of particle number determination, that is, the accuracy by which different numbers of particles can be counted rather than merely distinguishing the presence or absence of particles, the more efficient the process becomes. A more efficient process further can require a smaller device array space, and thus reservoir concentration may be higher without reducing accuracy.

Exemplary embodiments further may include a recording device that records a proportion of droplets being dispensed that contain a desired number of particles. The recording results may be compiled into a droplet history, and such a droplet history may be used to infer the particle density of the reservoir from which droplets are dispensed. Based on a determined characteristic of the reservoir, dispensed droplets containing zero or more than one particle may subsequently be returned to the reservoir to maintain the reservoir in a state that may selectively favor dispensing of additional droplets having a desired particle concentration.

Examples of advantages of the methods of the present invention include the following. The selected droplets that are routed to the reaction area reliably have the desired particle concentration, including when a single particle is desired, independent of the limits of Poisson statistics. In addition, rejected droplets are not wasted, which means that the use of reagents is optimized; reagents are not combined with rejected droplets that do not have the desired number of particles as occurs in conventional systems; reagents are selectively mixed with droplets known to contain a desirable concentration of particles; and the amount of device array space required for the operation is minimized. In addition, cumulative data from measurements may be used to alter the operations in real time such that accuracy is improved.

An aspect of the invention, therefore, is an enhanced method of partitioning droplets from a fluid reservoir containing particles, which provides a non-Poissonian distribution of dispensed droplets containing a desired number of particles. In exemplary embodiments, the method constitutes a method of operating an electrowetting on dielectric (EWOD) device including the steps of: inputting a fluid reservoir containing particles into the EWOD device; performing an electrowetting operation to dispense a plurality of dispensed droplets from the fluid reservoir; interrogating each droplet with a detector and determining whether each dispensed droplet has a desired number of particles; selecting dispensed droplets that contain the desired number of particles and performing an electrowetting operation to move the selected dispensed droplets to a reaction area on the EWOD device; and rejecting dispensed droplets that do not contain the desired number of particles and performing an electrowetting operation to move the rejected dispensed droplets to a holding area on the EWOD device that is different and spaced apart from the reaction area. The selected droplets may be combined, including with or without a portion of the rejected droplets and/or additional reagent, into a larger reaction droplet that may be used in subsequent reaction protocols.

In exemplary embodiments, the EWOD device includes a data logger, and the method further includes recording a droplet history of the selected and rejected droplets. The method further may include reading the droplet history from the data logger, and performing an electrowetting operation based on the droplet history to merge a portion of the rejected droplets from the holding area back into the fluid reservoir to maintain a particle concentration in the fluid reservoir having an increased probability of dispensing droplets with the desired number of particles.

Another aspect of the invention is a microfluidic system including an electro-wetting on dielectric (EWOD) device comprising an element array configured to receive liquid droplets, the element array comprising a plurality of individual array elements and wherein one of said liquid droplets comprises a fluid reservoir containing particles that is inputted into the EWOD device; a detector for detecting a property of a liquid droplet dispensed onto the element array; and a control system configured to perform electrowetting operations by controlling actuation voltages applied to the element array to perform manipulation operations as to liquid droplets present on the element array. The control system is configured to perform the method steps according to any of the embodiments.

Another aspect of the invention is a non-transitory computer-readable medium storing program code which is executed by a processing device for controlling actuation voltages applied to array elements of an element array of an electro-wetting on dielectric (EWOD) device comprising an element array configured to receive liquid droplets, the element array comprising a plurality of individual array elements and wherein one of said liquid droplets comprises a fluid reservoir containing particles that is inputted into the EWOD device. The program code is executable by the processing device to perform the method steps according to any of the embodiments.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF DRAWINGS

FIG. 5 is a drawing depicting an exemplary arrangement of thin film electronics in the exemplary AM-EWOD device of FIG. 2.

FIG. 7 is a drawing depicting an exemplary method of dispensing droplets from a fluid reservoir with a relatively high particle concentration.

FIG. 8 is a drawing depicting an exemplary method of dispensing droplets from a fluid reservoir with a relatively low particle concentration as compared to that of FIG. 7.

FIG. 9 is a drawing depicting an exemplary method of dispensing droplets from a high concentration fluid reservoir comparable to that of FIG. 7, and further utilizing a recording device that records a history of dispensed droplets.

FIG. 10 is a drawing depicting an exemplary method of dispensing droplets from a low concentration fluid reservoir comparable to that of FIG. 8, and further utilizing a recording device that records a history of dispensed droplets.

FIG. 11 is a drawing depicting an exemplary method of dispensing droplets from a low concentration fluid reservoir comparable to that of FIG. 8, and further utilizing a source droplet that may be diluted using rejected droplets to achieve a second fluid reservoir with a desirable particle concentration.

FIG. 12 is a drawing depicting an exemplary method of dispensing droplets from a high concentration fluid reservoir comparable to that of FIG. 9 and using the recording device, and further employing adding a diluent to the fluid reservoir to achieve a reservoir with desirable particle concentration based on the history of dispensed droplets.

DESCRIPTION OF EMBODIMENTS

Figure 1:
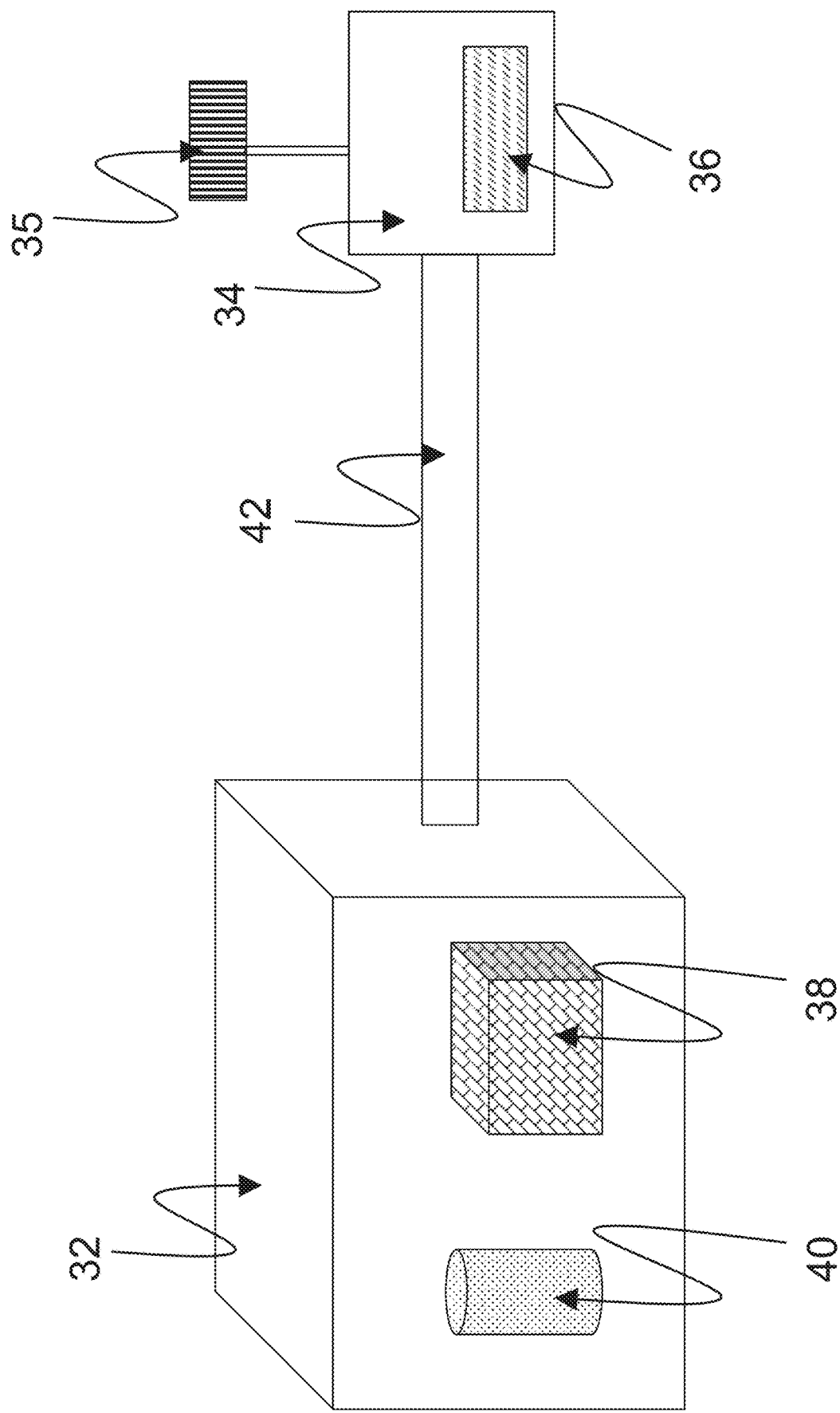
FIG. 1 is a drawing depicting an exemplary EWOD based microfluidic system.

Embodiments of the present invention will now be described with reference to the drawings, wherein like reference numerals are used to refer to like elements throughout. It will be understood that the figures are not necessarily to scale.

This present invention pertains to systems and methods of operating an AM-EWOD device that uses detection and feedback to partition sample droplets having a desired number of particles, and a single particle in particular, more reliably and at a fixed concentration, which may be more or less than the original reservoir concentration. Droplets on an electrowetting on dielectric (EWOD) device array are dispensed from a fluid reservoir containing particles of interest. A particle may, for example, be a physical particle such as a bead (latex, paramagnetic, colloidal gold) or a cell (prokaryotic or eukaryotic), or may also be some other element such as a protein or a nucleic acid that may be considered a "discrete" entity that could be separated from an aggregate or mixture.

Natively, the number of particles likely to be present in any dispensed droplet is governed by Poisson statistics and thus is not consistent across several dispensed droplets. In accordance with the various embodiments, each droplet may be detected by some means, for example, by optical or electrical interrogation, and the number of particles within each droplet is determined by suitable characterization (e.g., zero or more than zero; or zero, one, or more than one, or the like). Selected droplets that contain the desired number of particles are routed into a reaction area on the device array, while rejected droplets that do not contain the desired number of particles are directed to a holding area of the device array that is different and spaced apart from the reaction area. From the holding area, rejected droplets may be handled in a variety of ways. For example, rejected droplets may be directly routed back into the original reservoir, or held in a location separate from the reaction area until it is desirable to re-introduce the rejected droplets back into the reservoir. The rejected droplets may thus be recycled, and the process of dispensing droplets can be continued until the required number of selected droplets containing a desired number of particles (e.g. one particle) is created or until the reservoir can no longer dispense droplets that contain the desired number of particles. The more accurate the process of particle number determination, that is, the accuracy by which different numbers of particles can be counted rather than merely distinguishing the presence or absence of particles, the more efficient the process becomes. A more efficient process further can require a smaller device array space, and thus reservoir concentration may be higher without reducing accuracy.

Referring back to FIG. 1 illustrating the overall microfluidic system, among their functions, to implement the features of the present invention, the control electronics 38 may comprise a part of the overall control system that may execute program code embodied as a control application stored within the storage device 40. It will be apparent to a person having ordinary skill in the art of computer programming, and specifically in application programming for electronic control devices, how to program the control system to operate and carry out logical functions associated with the stored control application. Accordingly, details as to specific programming code have been left out for the sake of brevity. The storage device 40 may be configured as a non-transitory computer readable medium, such as random access memory (RAM), a read-only memory (ROM), an erasable programmable read-only memory (EPROM or Flash memory), or any other suitable medium. Also, while the code may be executed by control electronics 38 in accordance with an exemplary embodiment, such control system functionality could also be carried out via dedicated hardware, firmware, software, or combinations thereof, without departing from the scope of the invention.

The control system may be configured to perform some or all of the following functions:
Define the appropriate timing signals to manipulate liquid droplets on the AM-EWOD device 36.
Interpret input data representative of sensor information measured by a sensor or sensor circuitry associated with the AM-EWOD device 36, including computing the locations, sizes, centroids, perimeters, and particle constituents of liquid droplets on the AM-EWOD device 36.
Use calculated sensor data to define the appropriate timing signals to manipulate liquid droplets on the AM-EWOD device 36, i.e. acting in a feedback mode.
Provide for implementation of a graphical user interface (GUI) whereby the user may program commands such as droplet operations (e.g. move a droplet), assay operations (e.g. perform an assay), and the GUI may report the results of such operations to the user.

The control system, such as via the control electronics 38, may supply and control the actuation voltages applied to the electrode array of the microfluidics device 36, such as required voltage and timing signals to perform droplet manipulation operations and sense liquid droplets on the AM-EWOD device 36. The control electronics further may execute the application software to generate and output control voltages for droplet sensing and performing sensing operations.

The various methods described herein pertaining to enhanced droplet partitioning may be performed using structures and devices described with respect to FIGS. 1-6, including for example any control electronics and circuitry, sensing capabilities, and control systems including any processing device that executes computer application code stored on a non-transitory computer readable medium. The following figures illustrate various methods of partitioning droplets from a fluid reservoir, which in particularly may be performed by the AM-EWOD device control system executing program code stored on a non-transitory computer readable medium.

An aspect of the invention, therefore, is an enhanced method of partitioning droplets from a fluid reservoir containing particles, which provides a non-Poissonian distribution of dispensed droplets containing a desired number of particles. In exemplary embodiments, the method constitutes a method of operating an electrowetting on dielectric (EWOD) device including the steps of: inputting a fluid reservoir containing particles into the EWOD device; performing an electrowetting operation to dispense a plurality of dispensed droplets from the fluid reservoir; interrogating each droplet with a detector and determining whether each dispensed droplet has a desired number of particles; selecting dispensed droplets that contain the desired number of particles and performing an electrowetting operation to move the selected dispensed droplets to a reaction area on the EWOD device; and rejecting dispensed droplets that do not contain the desired number of particles and performing an electrowetting operation to move the rejected dispensed droplets to a holding area on the EWOD device that is different and spaced apart from the reaction area.

FIG. 7 is a drawing depicting an exemplary method of dispensing droplets from a fluid reservoir 2 with a relatively high particle concentration. Because of the relatively high concentration of particles, Poisson statistics predict that dispensed droplets are expected to isolate a number of droplets from such a fluid reservoir 2 having more than one particle per droplet, as well as droplets having one or zero particles.

The fluid reservoir 2 constitutes a fluid source from which particles 4 may be isolated by a process of dispensing a series of droplets 6, which are extracted from fluid reservoir 2 by applying electrowetting forces using an EWOD or AM-EWOD device such as, for example, the device described with respect to FIGS. 1-6. A particle 4 may be selected from any suitable or traditionally known particles or beads; such as for example: a latex bead, a paramagnetic bead, a colloidal solid (such as silver, gold), a cell (prokaryotic or eukaryotic), or a biological species such as an enzyme, a nucleic acid, an antibody, a protein, or other such distinguishable entity that may be considered a "discrete" element that may be separated from an aggregation or mixture. Generally, any entity that may constitute the particles 4 may be utilized within a subsequent reaction scheme or process, and thus it is desirable to isolate droplets 6 having a particular desired number of particles (such as for example one particle).

Each droplet 6 is interrogated by a detector 8 shown in broad schematic form that is used to determine the absence or presence of particles within each droplet. Detector 8 may be selected from any suitable sensor or measuring device, and may be external or internal to the element array of the AM-EWOD device, and such devices may be incorporated into a probe that may be moved into proximity with the AM-EWOD device array. Examples of sensor devices include the sensor module 35 that may include an optical sensor as described with respect to FIG. 1, and/or the integrated impedance sensor circuitry 90 as described with respect to FIG. 6. Examples of external detectors include measuring devices such as a microscope, a digital image acquisition system, camera or other optical sensor, a particle dispersion analyzer, or like sensing or measuring devices. As described above sensing circuitry may be integrated into the array element circuitry, and may include a capacitance sensor, a resistance sensor, impedance sensor, or like component of the array element circuitry that can detect an electrical property of a dispensed droplet from which droplet characteristics may be determined. The detector 8, therefore, may be any suitable sensor for optically observing the droplet, determining an electrical property of the droplet, and/or determining a mass of the droplet. The detector 8 specifically is used to determine the presence or absence of particles in the dispensed droplets 6, and optionally the precise number of particles present within any given dispensed droplet 6.

A processor (such as described with respect to the control electronics of FIG. 1) receives an input from the detector 8 and is configured to selectively direct droplets 6 to different areas of the EWOD device array based on particle concentration. For example, selected droplets 6a that have a desired particle concentration (for example one particle 4 per droplet 6) may be directed to a reaction area 10; whereas rejected droplets 6b that do not have the desired particle concentration (in this example droplets containing zero or more than one particle 4) may be directed to a holding area 12 on the EWOD device array that is different and spaced apart from the reaction area 10.

The rejected droplets that are moved to the holding area 12 may be processed subsequently in a variety of ways. For example, FIG. 7 depicts one option by which the rejected droplets 6b within holding area 12 may be merged back into fluid reservoir 2 to mitigate waste, thus becoming recycled for further droplet dispensing from the reservoir. In addition, although the holding area 12 is illustrated as a single area, the holding area may include multiple different areas, and such areas may have a relative priority for receiving the rejected droplets (e.g., primary, secondary, or tertiary holding areas) as required. The holding area or areas 12 may be used to store droplets that have particle concentrations that are considered not required for an immediate downstream processing or assay workflow. Droplets held within a holding area 12 may be used, as noted above, to modify the composition of the fluid reservoir 2, or for other purposes as discussed in more detail below.

The selected droplets 6a within reaction area 10 may be used for a desired downstream processing, wherein the particle 4 may participate in a desired reaction scheme, such as a biological or chemical assay or other reaction protocol. The reaction area 10 itself can be an area of the EWOD device array in which the downstream processing or assays may be performed. Alternatively or additionally, the selected droplets 6a may be moved using electrowetting forces to another portion of the EWOD device array where the downstream processing can occur. In this manner, the selected droplets 6a having the desired particle concentration are isolated from the fluid reservoir 2 and rejected droplets 6b, and said selected droplets 6a may be introduced into an assay workflow. Such an assay workflow, for example, may be a determination of cell type (e.g., identification of pathogenic organisms), nucleic acid amplification, a bead-based immunoassay, or any other suitable assay or reaction protocol.

FIG. 8 is a drawing depicting an exemplary method of dispensing droplets from a fluid reservoir 3 with a relatively low particle concentration as compared to the fluid reservoir 2 of FIG. 7. Because of the relatively low concentration of particles in the fluid reservoir 3, Poisson statistics predict that dispensed droplets are expected to isolate very few or no droplets containing more than one particle; however, it is also is expected that a greater number of droplets will be isolated that contain zero particles.

A partitioning method otherwise may proceed comparably as described with respect to FIG. 7. The fluid reservoir 3 constitutes a fluid source from which particles 4 may be isolated by a process of dispensing a series of droplets 6, which are extracted from fluid reservoir 3 by applying electrowetting forces using an EWOD or AM-EWOD device. Each droplet 6 is interrogated by a detector 8 as described above to determine the absence or presence of particles within each droplet, and optionally determines the number of particles in each droplet, and detector 8 may be any suitable external sensing device or sensing circuitry that is integrated into the array element circuitry. A processor receives an input from the detector 8 and is configured to selectively direct droplets 6 to different areas of the EWOD device array based on particle concentration. Selected droplets 6a that have a desired particle concentration (for example one particle 4 per droplet 6) may be directed to a reaction area 10 for use in later downstream processing as part of a reaction protocol or assay, whereas rejected droplets 6b that do not have the desired particle concentration may be directed to a holding area 12 on the EWOD device array that is different and spaced apart from the reaction area 10. In this example, because of the relatively low initial particle concentration of fluid reservoir 3, the rejected droplets 6b moved to the holding area 12 will predominantly be null droplets having zero particles. The rejected droplets may be recycled back into the fluid reservoir 3 to modify the composition of the fluid reservoir 3, or for other purposes as discussed in more detailed below.

FIG. 9 is a drawing depicting an exemplary method of dispensing droplets from a high concentration fluid reservoir 2 comparable to that of FIG. 7, and further utilizing a recording device that records a history of dispensed droplets. In exemplary embodiments, the recording device may be configured as a data logger 14 that maintains a record or history of the respective compositions of each dispensed droplet 6 that has been interrogated by detector 8. The data logger may be any suitable processing device for recording and memory device for storing data, such as described with respect to the control electronics 38 and memory device 40 of FIG. 1. A processor such as described with respect to the control electronics of FIG. 1 further is configured to determine a notional composition of the fluid reservoir 2 based on the information accumulated in the data logger 14, according to the relative compositions of the respective dispensed droplets 6 isolated from the reservoir and based on the Poissonian statistics. It will be appreciated that the various computer implemented processing and memory devices may be combined or separated into any number of one or more control components as may be suitable for any particular application.

The AM-EWOD device control system may be configured to selectively reintroduce rejected droplets 6b including zero or more than one particle based on this droplet history stored in the data logger 14, such that the fluid reservoir 2 is maintained with a particle distribution having an increased probability of dispensing droplets with the desired number of particles (e.g., one particle per droplet), which behavior may be considered non-Poissonian. In this manner, the particle concentration of the fluid reservoir 2 may be controlled to optimize the dispensing of subsequent droplets that are more likely to have the desired number of particles.

FIG. 10 is a drawing depicting an exemplary method of dispensing droplets from a low concentration fluid reservoir 3 comparable to that of FIG. 8, and further utilizing a recording device such as the data logger 14 that records a history of dispensed droplets. Similarly as described with respect to FIG. 9, a processor is configured to determine a notional composition of the fluid reservoir 3 based on the information accumulated in data logger 14, according to the relative compositions of the respective droplets 6 isolated from the reservoir and based on the Poissonian statistics. Based on the droplet history stored in the data logger 14, the AM-EWOD device control system may be configured to selectively reintroduce rejected droplets 6b into the fluid reservoir 3, which in this case predominantly will have zero particles because of the lower starting concentration, such that the fluid reservoir 3 is maintained with a particle distribution having an increased probability of dispensing droplets with the desired number of particles (e.g., one particle per droplet), which behavior may be considered non-Poissonian. In this manner, the particle concentration of the fluid reservoir 3 may be controlled to optimize the dispensing of subsequent droplets that are more likely to have the desired number of particles. In this example, because of the relatively low initial particle concentration of fluid reservoir 3, as noted the rejected droplets 6b moved to the holding area 12 will predominantly be null droplets having zero particles, which affects how the rejected droplets are reintroduced into the initial fluid reservoir as compared to the circumstance of FIG. 9 employing the high concentration fluid reservoir 2.

In exemplary embodiments, therefore, it may be desirable to maintain a relatively high number of particles within the fluid reservoir, whereas in other embodiments it may be desirable to maintain a relatively low number of particles within the fluid reservoir, to improve the yield of the selected droplets 6a containing the desired number of particles (which may be one particle). It might be expected, based on Poisson statistics, that in embodiments in which a high number of particles are present in the fluid reservoir (e.g., fluid reservoir 2), the chances of isolating a droplet from the reservoir that contains at least one particle might be high. In such embodiment, however, there is an increased probability of isolating droplets that may contain two, three or possibly more particles. Thus, when it may be desirable to dispense droplets containing only a single particle for further reaction processes, to mitigate loss or waste of particles contained within droplets in which two or more particles exist, such droplets could be returned to the fluid reservoir for further droplet separation processing, and at a rate that maintains a particle concentration in the fluid reservoir that is likely to yield dispensed droplets with the desired number of particles. Additional droplets would thus be separated from the fluid reservoir with the prospect of achieving additional droplets having the desired particle number.

Conversely, when dispensing droplets from a fluid reservoir containing a low concentration of particles (e.g., fluid reservoir 3), the likelihood of dispensing droplets with more than one particle might be low. However, the chance of obtaining a droplet that contains zero particles is increased. Thus, in embodiments in which a fluid reservoir with a low concentration of particles is used, although the number of droplets dispensed from the reservoir that contain multiple particles may be low to zero, there may be an increased likelihood of dispensing droplets which contain zero particles. Consequently, there may be an increased number of droplets that would be redirected to a secondary holding location. A proportion of the rejected droplets containing zero particles may be returned to the reservoir, and again at a rate that maintains a particle concentration in the fluid reservoir that is likely to yield dispensed droplets with the desired number of particles (and a single particle in particular).

FIG. 11 is a drawing depicting an exemplary method of dispensing droplets from a low concentration fluid reservoir 3 comparable to that of FIG. 8, and further utilizing a source droplet that may be diluted using rejected droplets to achieve a second fluid reservoir with a desirable particle concentration. In this example, rejected droplets 6b in the holding area 12 may be combined into a pooled droplet 16. Because a low concentration fluid reservoir 3 is used in this embodiment, the pooled droplet 16 is expected to have zero (or at least very few) particles. Also in this embodiment, an additional source droplet 18 may be inputted onto the device array, and the source droplet 18 may have a concentration of particles that is greater than a concentration of particles in the fluid reservoir 3.

Fluid from the pooled droplet 16 may be combined with the source droplet 18 to yield a new, second fluid reservoir 19 that has a particle concentration that is desirable to achieve selective dispensing of droplets containing none, one, or more than one particle, as may be desired. The second fluid reservoir 19 may have the same or a different particle concentration as compared to the first fluid reservoir 3. The second fluid reservoir 19 then may be used to dispense additional droplets, with the methods of previous figures being applied to droplets dispensed from the second fluid reservoir 19. In other words, droplets dispensed from the second fluid reservoir 19 containing a desired number of particles (e.g., one particle) are selected droplets that are moved to a reaction area (which may be different from the reaction area 10 associated with the first fluid reservoir 3), and droplets dispensed from the second fluid reservoir 19 that do not contain the desired number of particles are rejected droplets that are moved to a holding area (which may be different from the holding area 12 associated with the first fluid reservoir 3).

FIG. 12 is a drawing depicting an exemplary method of dispensing droplets from a high concentration fluid reservoir 2 comparable to that of FIG. 9 and using the recording device 14, and further employing adding a diluent to the fluid reservoir to achieve a reservoir with desirable particle concentration based on the history of dispensed droplets. The is achieved by employing a second recording device, such as a second data logger 15, in combination with the first data logger 14. Although FIG. 12 depicts the data loggers 14 and 15 as separate components, they can be combined or integrated into a single data logger configured as a unitary control/memory device.

The second data logger 15 may store additional information representing the state of the EWOD system as a whole. In this example, the fluid reservoir 2 contains a relatively high particle concentration. The data loggers 14 and 15 begin to develop a particle concentration history of the system, and the processor may be configured to selectively dispense fluid from pooled droplet 16 into the fluid reservoir 2 to achieve a desirable particle distribution within reservoir 2 that in turn leads to dispensed droplets 6 having an enhanced probability of having the desired particle concentration. Accordingly, with additional data logging, the embodiment of FIG. 12 monitors the ongoing concentration within the fluid reservoir 2, as well as the particle numbers present in the dispensed droplets 6 as done in previous embodiments, to control the ongoing concentration in the fluid reservoir 2 to optimize the dispensing of subsequent droplets to increase the likelihood such droplets will have the desired number of particles. The pooled droplet 16 may be a combination of rejected droplets 6b having zero particles as shown in FIG. 12, or the droplet 16 may be a diluent droplet that is separately inputted onto the device array. By employing a relatively high concentration fluid reservoir 2, the additional source droplet having particles as used in the embodiment of FIG. 11 is not required.

Figure 13A:
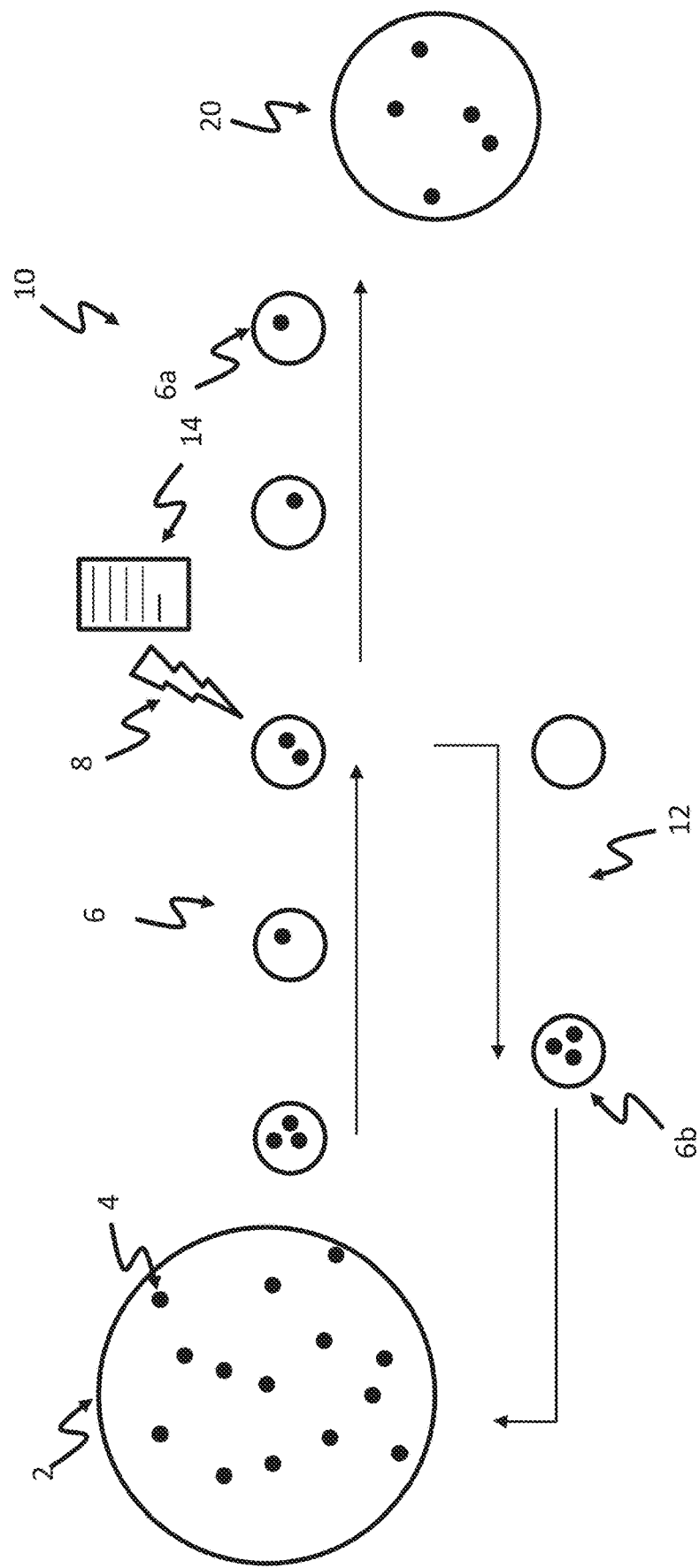
FIG. 13A and FIG. 13B are drawings depicting an exemplary method of dispensing droplets from a high concentration fluid reservoir comparable to that of FIG. 9 and using the recording device, and further employing the history of dispensed droplets to permit amalgamation of such droplets to produce a reaction droplet with a known particle concentration.
Figure 13B:
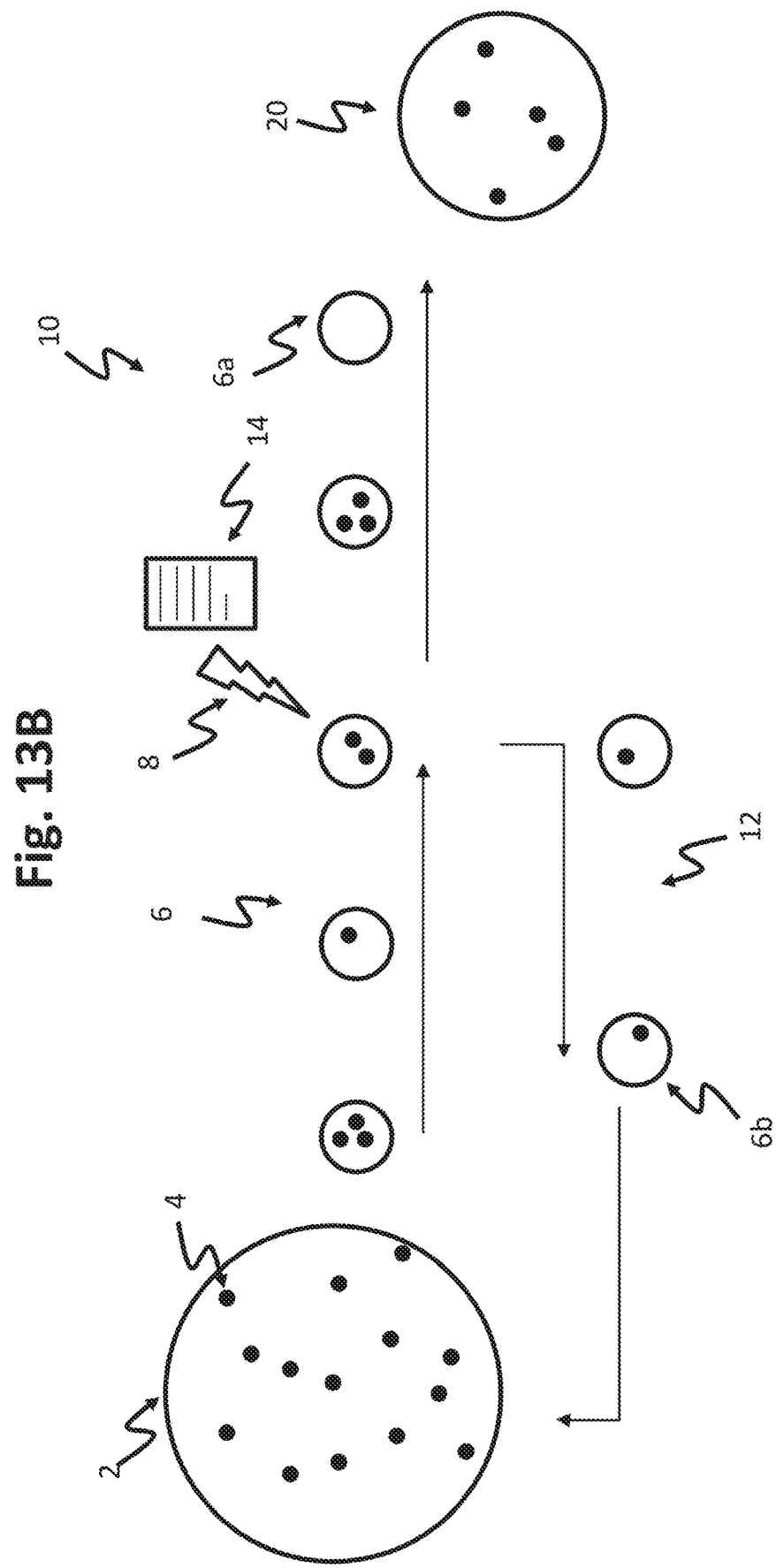

FIG. 13A and FIG. 13B are drawings depicting an exemplary method of dispensing droplets from a high-concentration fluid reservoir 2 comparable to that of FIG. 9 and using the recording device or data logger 14, and further employing the history of dispensed droplets to permit amalgamation of selected droplets to produce a larger reaction droplet with a known particle concentration. In this embodiment, the processor is configured to selectively combine selected droplets 6a, each having the desired number of particles, from within reaction area 10 to yield a reaction droplet 20 that has a known volume and concentration of particles. By such amalgamation, the reaction droplet 20 has a larger volume than the individual selected droplets 6a, but may have a comparable particle concentration. As shown in the example of FIG. 13A, in one embodiment droplets determined to contain a single particle 6a are combined to yield the reaction droplet 20 of known volume and particle concentration.

The example of FIG. 13B illustrates an alternative implementation, wherein droplets determined to hold a single particle are transferred to the holding area 12 in contrast to the example of FIG. 13A. Also in contrast to the example of FIG. 13A, in the example of FIG. 13B droplets containing zero or more than one particle may be selectively combined to form reaction droplet 20 that has a known volume and particle concentration. The selective combination of droplets in the examples of FIGS. 13A and 13B is facilitated through the use of the historical record of each droplet retained by data logger 14. Droplets transferred to reaction area 10 may be stored in unique array elements of a device array prior to further processing. Data logger 14 also may maintain a record of the spatial location of each dispensed droplet 6, and thus both the content of the droplet and location of the droplet within the device array are known. Droplets may therefore be selectively transferred to a dedicated portion of the device array prior to being combined into the reaction droplet 20 so as to achieve the required volume and particle concentration within the reaction droplet 20. As a numerical example, reaction droplet 20 may comprise twenty dispensed droplets each having a single particle, or four droplets having three particles, four droplets having two particles and twelve droplets having no particles, to achieve an equivalent combined volume and particle concentration.

Figure 14:
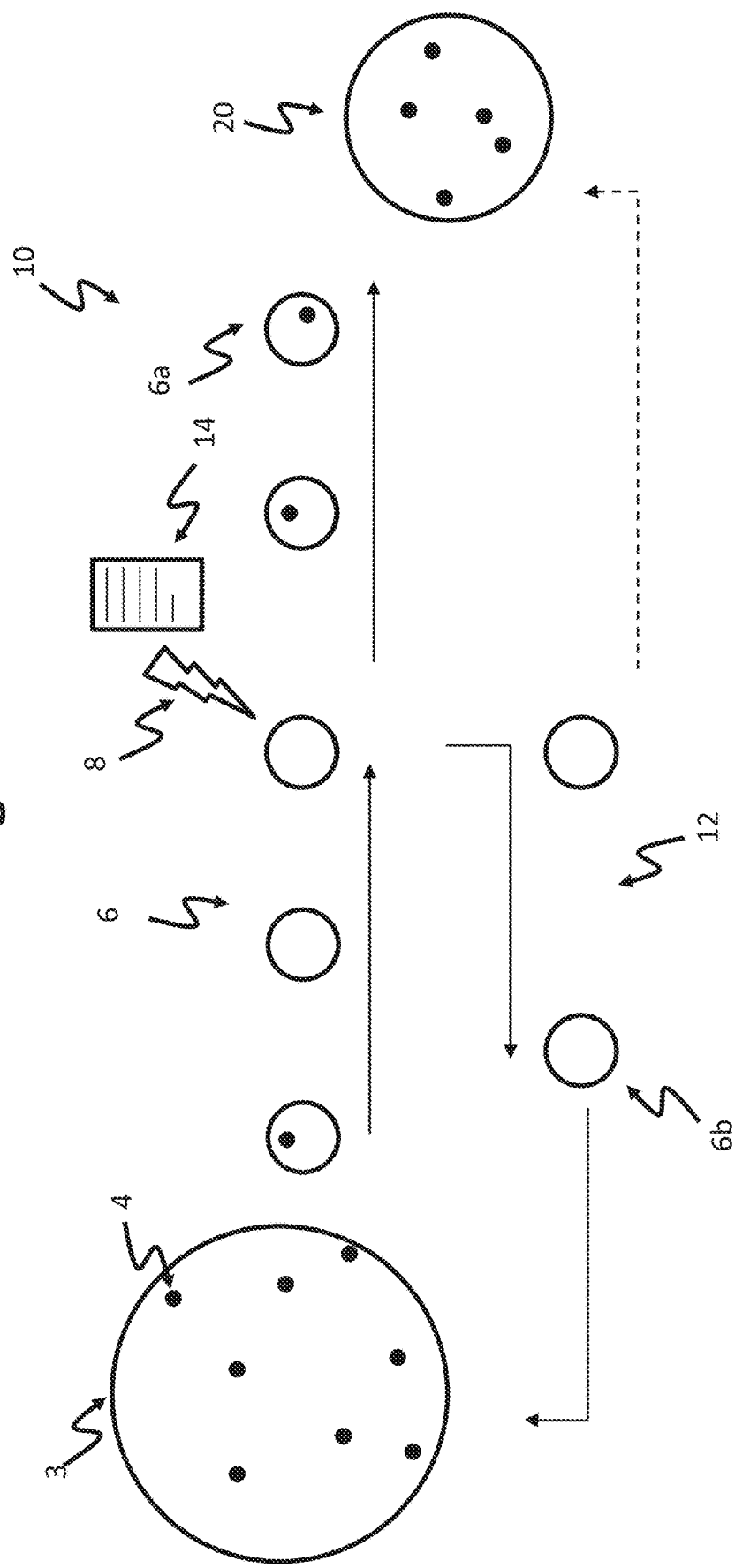
FIG. 14 is a drawing depicting an exemplary method of dispensing droplets from a fluid reservoir comparable to that of FIG. 13A, except employing a low concentration reservoir in connection with employing the history of dispensed droplets to permit amalgamation of such droplets to produce a reaction droplet with a known particle concentration.

FIG. 14 is a drawing depicting an exemplary method of dispensing droplets from a fluid reservoir comparable to that of FIG. 13A, except employing a low-concentration reservoir 3 in connection with employing the history of selected droplets to permit amalgamation of such droplets to produce a larger reaction droplet with a known particle concentration. The processor again is configured to receive inputs from the data logger 14, based on which droplets from within reaction area 10 may be combined to yield a larger reaction droplet 20 of known volume and particle concentration. Reaction droplet 20 may be formed to contain a higher concentration of particles than the initial reservoir 3 through selective addition of single particle containing droplets that were transferred to reaction area 10. The reaction droplet 20 alternatively may be formed to contain a lower particle concentration compared with the reservoir 3 by selective combination of selected droplets 6a from reaction area 10 and a portion of the rejected droplets, 6b from holding area 12, as shown by the dashed line in FIG. 14. Furthermore, rejected droplets 6b having no particle may be returned to fluid reservoir 3 as in previous embodiments to maintain a desired particle concentration within fluid reservoir 3 that would be expected to yield dispensed droplets having none or one particle as desired. Any droplets from within holding area 12 that are not required for further processes, such as for forming the reaction droplet 20 or recycling back into the fluid reservoir 3, may be directed to a waste area on the AM-EWOD device (not shown).

Figure 15:
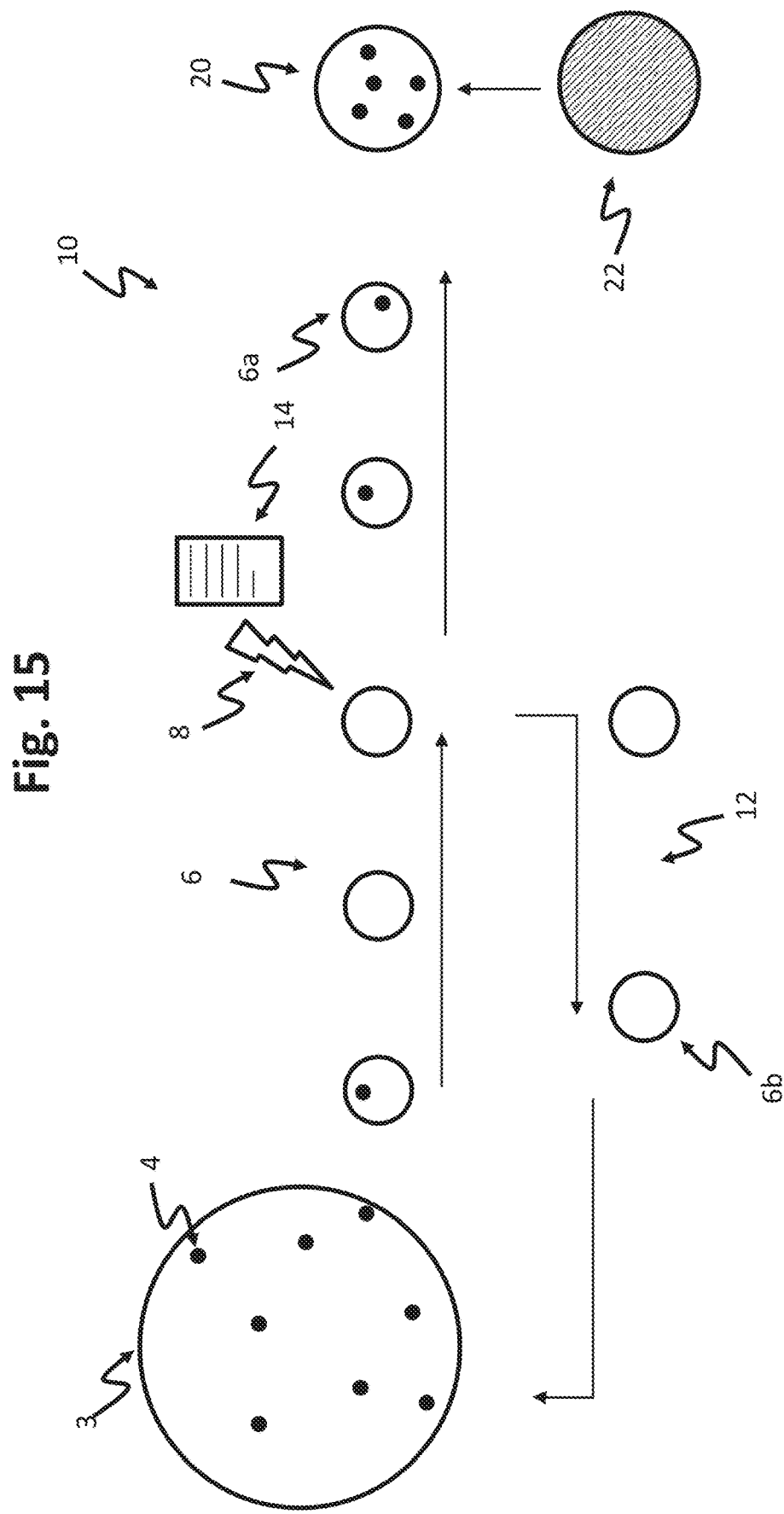
FIG. 15 is a drawing depicting the method of dispensing droplets of FIG. 14, and further introducing a different diluent from a second fluid reservoir to alter the composition of the reaction droplet with known particle concentration.

FIG. 15 is a drawing depicting a method of dispensing droplets comparable to FIG. 14, and further introducing a different diluent from a second fluid reservoir to alter the composition of the reaction droplet with known particle concentration. In particular, a second fluid reservoir 22 may be inputted into the EWOD device, and said second fluid reservoir 22 may constitute a reagent droplet for combining reagents with dispensed droplets 6a to form the reaction droplet 20. The processor may be configured to receive inputs from the data logger 14 regarding the formation of the selected droplets 6a having the desired particle concentration (e.g., one particle). Based on such inputs, the processor may selectively control the combination of selected droplets 6a from the reaction area 10 with fluid separated from the reagent droplet 22 to form the reaction droplet 20. The reaction droplet 20 formed of a portion of reagent droplet 22 combined with selected droplets 6a from reaction area 10 may be used for subsequent reaction processes. The processor further may be configured to deliver either the total volume of reaction droplet 20, or a portion of reaction droplet 20 containing a known number or concentration of particles, to a downstream reaction system, wherein the reaction droplet may participate in one or more reaction processes.

Figure 2:
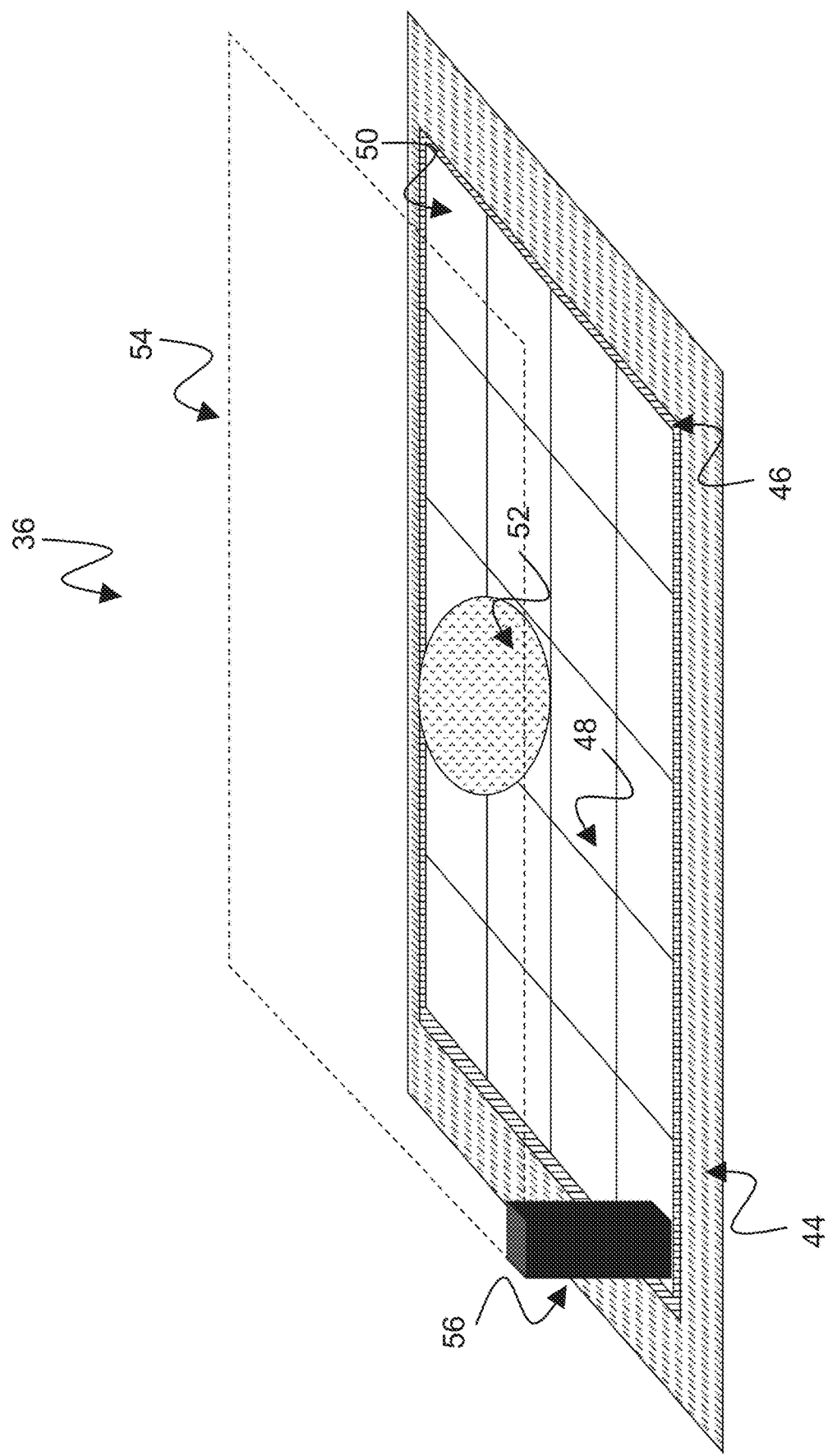
FIG. 2 is a drawing depicting an exemplary AM-EWOD device in a perspective view.
Figure 3:
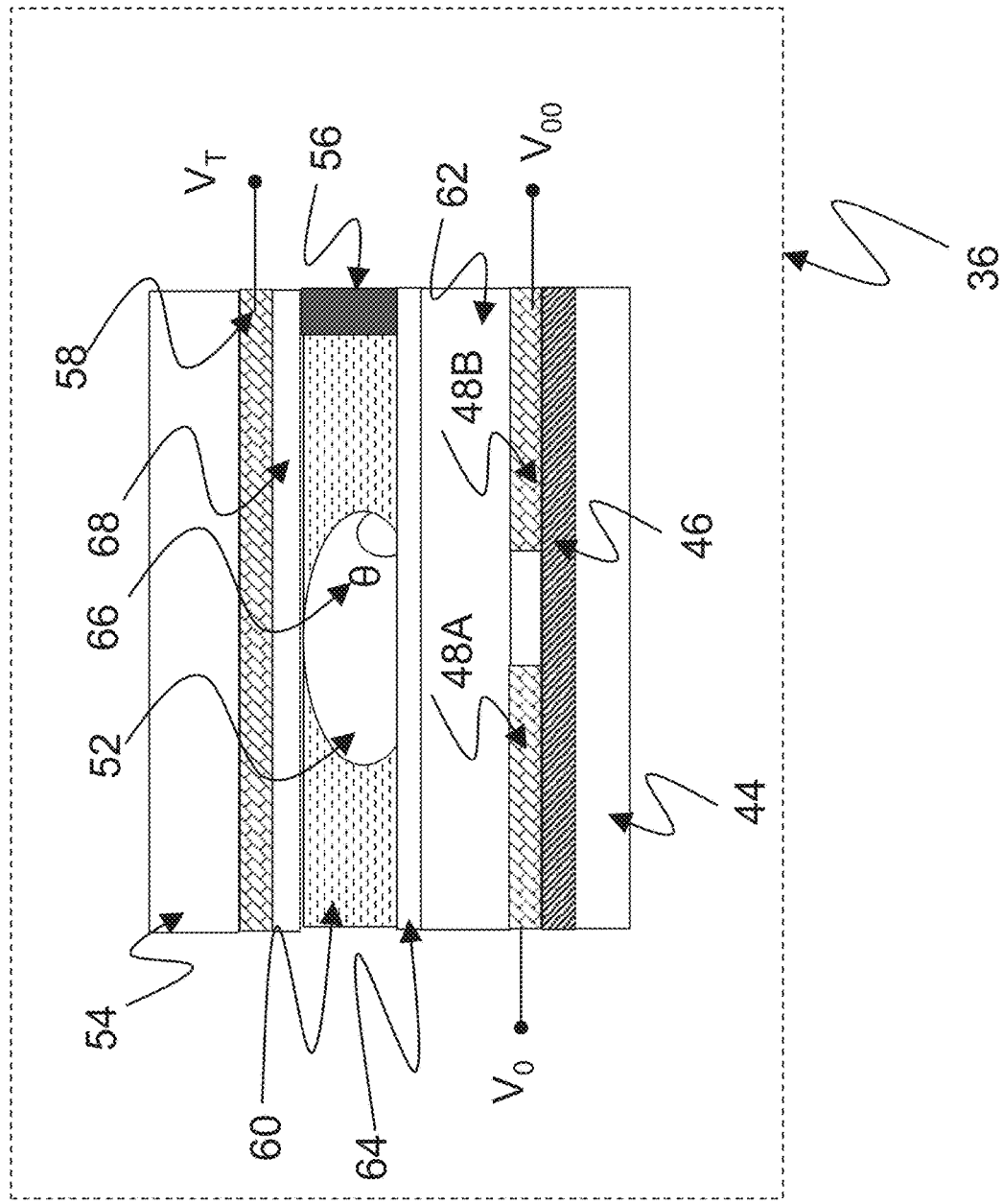
FIG. 3 is a drawing depicting a cross section through some of the array elements of the exemplary AM-EWOD device of FIG. 2.
Figure 4B:
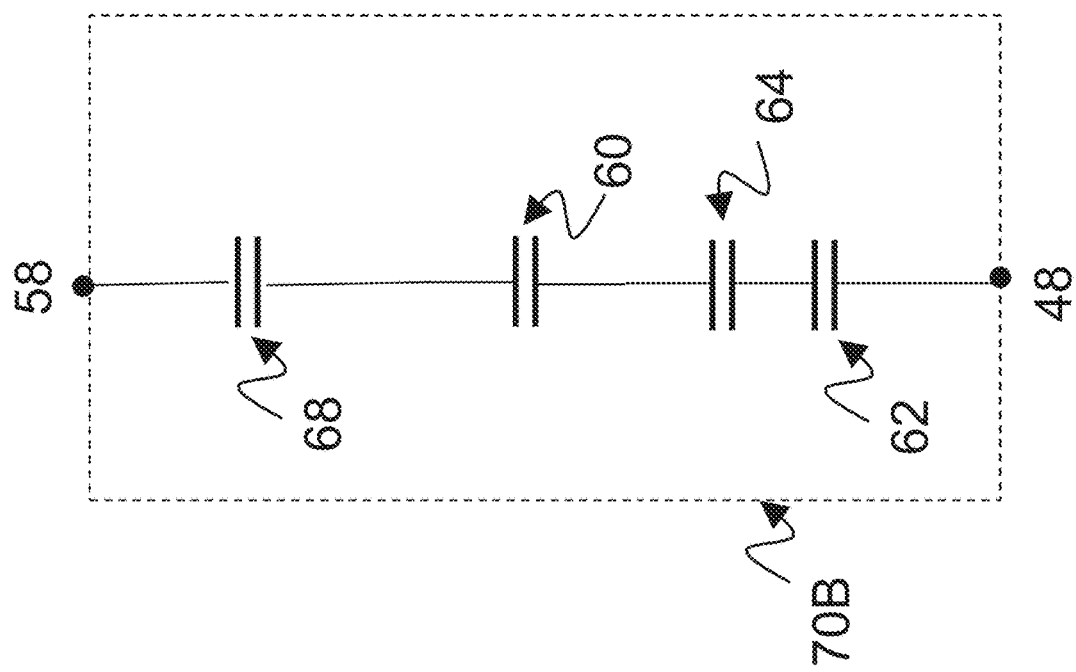
FIG. 4B is a drawing depicting a circuit representation of the electrical load presented at the element electrode when no liquid droplet is present.
Figure 4A:
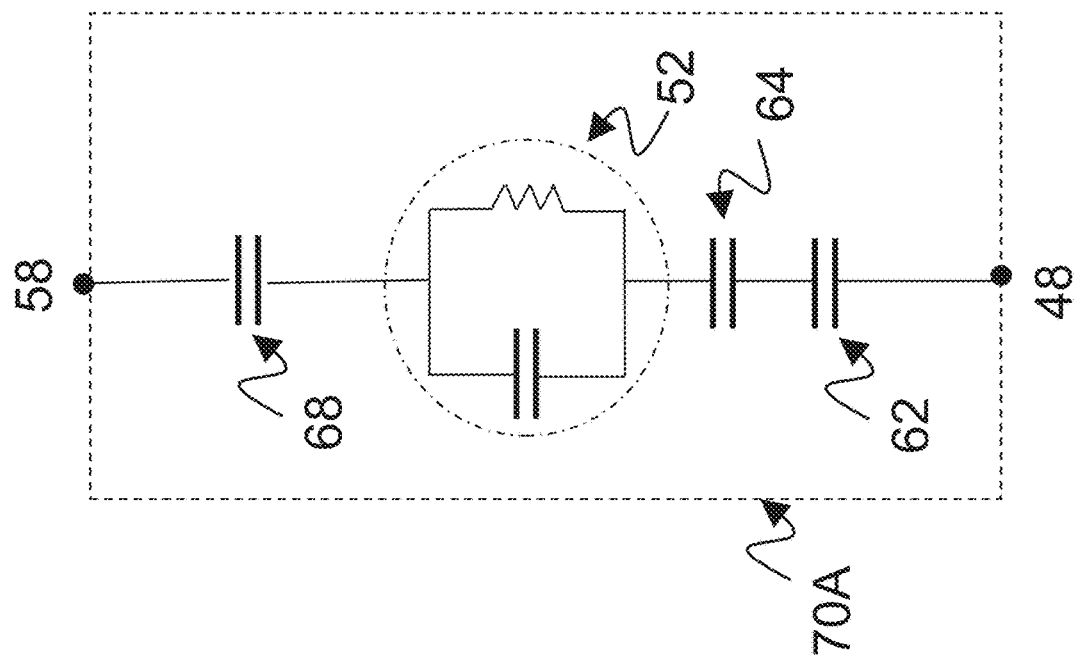
FIG. 4A is a drawing depicting a circuit representation of the electrical load presented at the element electrode when a liquid droplet is present.
Figure 6:
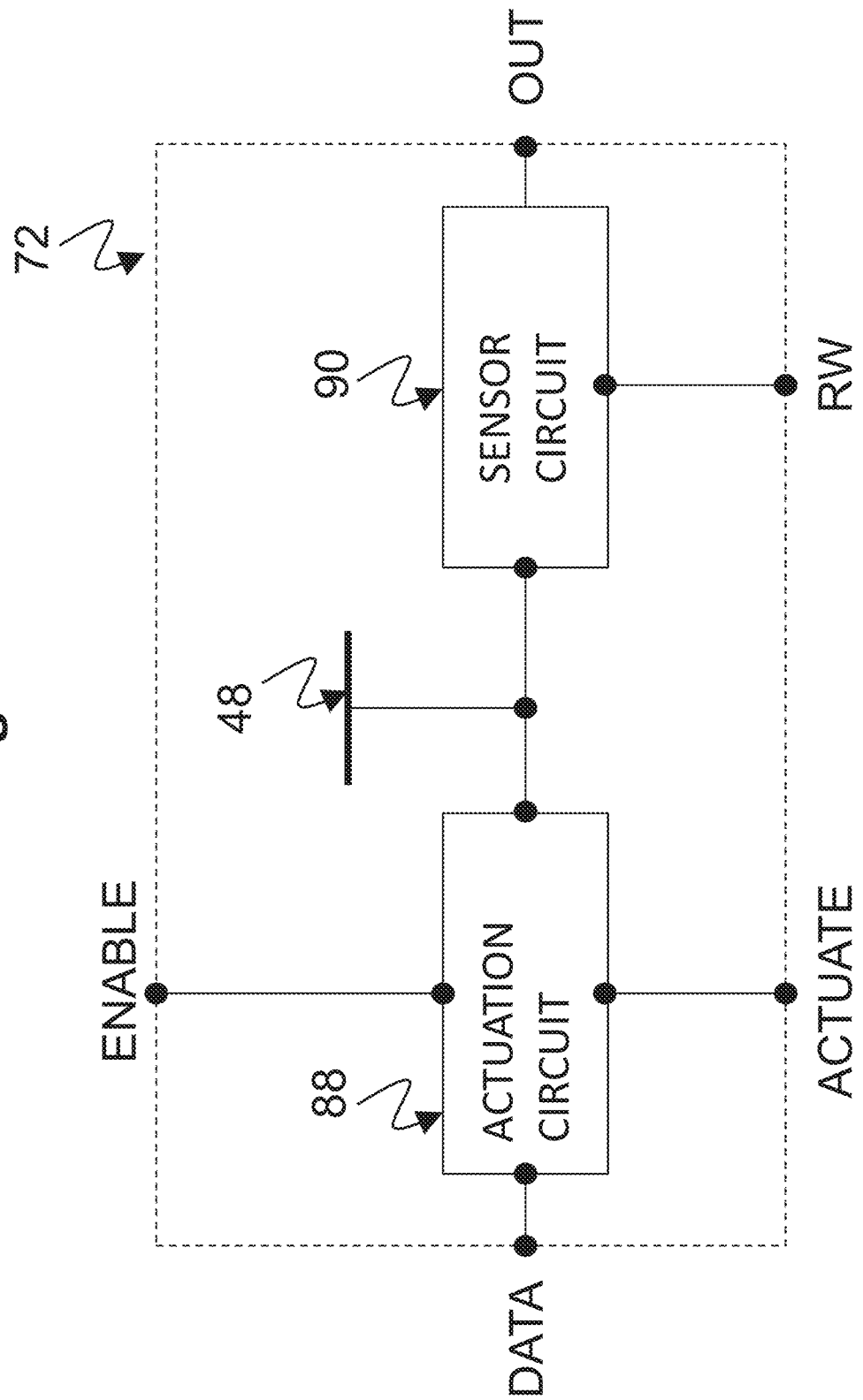
FIG. 6 is a drawing depicting exemplary array element circuitry for an AM-EWOD device.

In each of the foregoing partitioning methods, depicted in FIGS. 7-15, the beneficial characteristics of an AM-EWOD device such as depicted in FIGS. 1-6 are utilized to achieve the selective droplet dispensing and spatial droplet storing within the element array of the AM-EWOD device. In use, a two-dimensional array element array (x, y) such as depicted in FIGS. 2 and 5 defines the active area within which droplet manipulation operations may be performed. The systems and processes of the present invention may be implemented within an AM-EWOD element array of any (x, y) dimensional size. The two-dimensional size determines the respective volume of fluid that may be controlled within the device. Each array element within the element array may be associated with a unique reference data item for tracking droplet operations at a given array element. Using the array element reference data, the data logger 14 (or multiple data loggers) maintains a record or history of the spatial location of each of the following fluidic items on the element array as warranted for any particular embodiment and application: the initial fluid reservoir 2 or 3, dispensed droplets 6 including selected droplets 6a and rejected droplets 6b, a pooled droplet 16, an additional source droplet 18, a formed reaction droplet 20, and a dedicated reagent droplet 22 within the device array. Such data may be used by the processor to permit the selective movement of one or more than one droplet of each droplet category from a first location to a second location on the element array of the AM-EWOD device, according to the process or reaction scheme in which the fluid reservoir is being utilized.

Typically, the processor is configured to follow a reaction protocol that is embodied as program code stored on a non-transitory computer readable medium, such as described with respect to FIG. 1. In accordance with the reaction protocol, the processor generates control signals for applying selective actuation voltages to the array elements of the AM-EWOD device to generate electrowetting forces to perform the desired droplet manipulation operations. The reaction protocol may contain a series of one or more droplet manipulation operations that may be performed in sequence, or simultaneously, to achieve a desired outcome in accordance with the reaction protocol. Information contained in the data logger(s) may be used throughout the implementation of a reaction protocol by the processor to implement the desired droplet operations to obtain a resultant droplet configuration that is suitable for subsequent processing of a reaction droplet in accordance with an assay workflow. The droplet manipulation operations may include, for example, dispensing droplets from the initial reservoir; moving selected droplets into a reaction area and rejected droplets into a separate holding area; forming a reaction droplet from selected droplets with or without fluid from rejected droplets and/or an additional reagent droplet; recycling rejected droplets back into the fluid reservoir; moving selected droplets and/or resultant reaction droplets to another location on the device array and performing a reaction protocol; and/or other droplet manipulation operations that may be warranted in accordance with any of the embodiments.

The integration of the fluid handling system in accordance with embodiments of the present invention enables selective control and manipulation of droplets containing particles, and may contribute to a total assay workflow in which there is a beneficial improvement in the efficiency with which reagents are used. Unlike traditional microfluidic based systems, in which a reagent is generally mixed with every droplet flowing through the system, the system and methods of this disclosure enable downstream processing of only those droplets having a desired particle concentration. Consequently, there may be a reduction in the average cost per measurement made, since reagents (which may be costly) are no longer mixed with every droplet flowing through the system, but only those expected to yield a desired outcome.

Examples of advantages of the methods of the present invention include the following. The selected droplets that are routed to the reaction area reliably have the desired particle concentration, including when a single particle is desired, independent of the limits of Poisson statistics. In addition, rejected droplets are not wasted, which means that the use of reagents is optimized; reagents are not combined with rejected droplets that do not have the desired number of particles as occurs in conventional systems; reagents are selectively mixed with droplets known to contain a desirable concentration of particles; and the amount of device array space required for the operation is minimized. In addition, cumulative data from measurements may be used to alter the operations in real time such that accuracy and efficiency are improved.

An aspect of the invention, therefore, is an enhanced method of partitioning droplets from a fluid reservoir containing particles, which provides a non-Poissonian distribution of dispensed droplets containing a desired number of particles. In exemplary embodiments, the method constitutes a method of operating an electrowetting on dielectric (EWOD) device including the steps of: inputting a fluid reservoir containing particles into the EWOD device; performing an electrowetting operation to dispense a plurality of dispensed droplets from the fluid reservoir; interrogating each droplet with a detector and determining whether each dispensed droplet has a desired number of particles; selecting dispensed droplets that contain the desired number of particles and performing an electrowetting operation to move the selected dispensed droplets to a reaction area on the EWOD device; and rejecting dispensed droplets that do not contain the desired number of particles and performing an electrowetting operation to move the rejected dispensed droplets to a holding area on the EWOD device that is different and spaced apart from the reaction area. The method of operating may include one or more of the following features, either individually or in combination.

In an exemplary embodiment of the method, the method further includes performing an electrowetting operation to merge a portion of the rejected droplets from the holding area back into the fluid reservoir.

In an exemplary embodiment of the method, the method further includes pooling a portion of the rejected droplets into a pooled droplet, and performing an electrowetting operation to merge a portion of the pooled droplet back into the fluid reservoir.

In an exemplary embodiment of the method, the method further includes pooling a portion of the rejected droplets into a pooled droplet; inputting a source droplet containing particles into the EWOD device; and performing an electrowetting operation to merge a portion of the pooled droplet with the source droplet to from a second fluid reservoir containing particles.

In an exemplary embodiment of the method, the EWOD device includes a data logger, and the method further comprises recording a droplet history of the selected and rejected droplets.

In an exemplary embodiment of the method, the method further includes reading the droplet history from the data logger; and performing an electrowetting operation based on the droplet history to merge a portion of the rejected droplets from the holding area back into the fluid reservoir to maintain a particle concentration in the fluid reservoir having an increased probability of dispensing droplets with the desired number of particles.

In an exemplary embodiment of the method, the method further includes pooling a portion of the rejected droplets into a pooled droplet, and performing an electrowetting operation to merge a portion of the pooled droplet back into the fluid reservoir based on the droplet history.

In an exemplary embodiment of the method, the method further includes using a portion of the selected droplets containing the desired number of particles in a subsequent reaction protocol.

In an exemplary embodiment of the method, the method further includes merging a portion of the selected droplets containing the desired number of particles to form a reaction droplet.

In an exemplary embodiment of the method, the method further includes merging a portion of the rejected droplets that do not contain the desired number of particles with the portion of the selected droplets to form the reaction droplet.

In an exemplary embodiment of the method, the method further includes inputting a reagent droplet into the EWOD device, and merging a portion of the reagent droplet with the portion of the selected droplets to form the reaction droplet.

In an exemplary embodiment of the method, the desired number of particles is exactly one particle in a dispensed droplet.

In an exemplary embodiment of the method, the method further includes determining a number of particles in each of the dispensed droplets.

In an exemplary embodiment of the method, interrogating a dispensed droplet comprises optically observing the droplet, determining an electrical property of the droplet, and/or determining a mass of the droplet.

In an exemplary embodiment of the method, the method further includes repeating the method according to any of the embodiments until a sufficient number of selected droplets containing the desired number of particles is dispensed, or until the fluid reservoir can no longer dispense droplets that have the desired number of particles.

Another aspect of the invention is a microfluidic system including an electro-wetting on dielectric (EWOD) device comprising an element array configured to receive liquid droplets, the element array comprising a plurality of individual array elements and wherein one of said liquid droplets comprises a fluid reservoir containing particles that is inputted into the EWOD device; a detector for detecting a property of a liquid droplet dispensed onto the element array; and a control system configured to perform electrowetting operations by controlling actuation voltages applied to the element array to perform manipulation operations as to liquid droplets present on the element array. The system further may include a data logger that records a droplet history of the selected and rejected droplets. The detector may include a sensor that is external to the element array of the EWOD device and/or sensing circuitry that is integrated into array element circuitry of each of the array elements of the EWOD device. The control system is configured to perform the method steps according to any of the embodiments.

Another aspect of the invention is a non-transitory computer-readable medium storing program code which is executed by a processing device for controlling actuation voltages applied to array elements of an element array of an electro-wetting on dielectric (EWOD) device comprising an element array configured to receive liquid droplets, the element array comprising a plurality of individual array elements and wherein one of said liquid droplets comprises a fluid reservoir containing particles that is inputted into the EWOD device. The program code is executable by the processing device to perform the method steps according to any of the embodiments.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The described embodiments could be used to provide an enhance AM-EWOD device. The AM-EWOD device could form a part of a lab-on-a-chip system. Such devices could be used for optical detection of biochemical or physiological materials, such as for cell detection and cell counting. Applications include healthcare diagnostic testing, material testing, chemical or biochemical material synthesis, proteomics, tools for research in life sciences and forensic science.

REFERENCE SIGNS LIST

2—fluid reservoir of relatively high particle concentration
3—fluid reservoir of relatively low particle concentration
4—particles
6—dispensed droplets
6a—selected dispensed droplets
6b—rejected dispensed droplets
8—detector
10—reaction area
12—holding area
14—data logger
15—second data logger
16—pooled droplet
18—additional source droplet
19—second fluid reservoir
20—reaction droplet
22—second fluid reservoir
32—reader
34—cartridge
35—external sensor module
36—AM-EWOD device
38—control electronics
40—storage device
44—lower substrate assembly
46—thin film electronics
48—array element electrodes
48A—array element electrode
48B—array element electrode
50—two-dimensional element array
51—array element
52—liquid droplet
54—top substrate
56—spacer
58—reference electrode
60—non-polar fluid
62—insulator layer
64—first hydrophobic coating
66—contact angle
68—second hydrophobic coating
70A—electrical load with droplet present
70B—electrical load without droplet present
72—array element circuit
74—integrated row driver
76—column driver
78—integrated sensor row addressing
80—column detection circuits
82—serial interface
84—voltage supply interface
86—connecting wires
88—actuation circuit
90—droplet sensing circuit

What is claimed is:

1. A microfluidic system comprising:
an electro-wetting on dielectric (EWOD) device comprising an element array configured to receive liquid droplets, the element array comprising a plurality of individual array elements and wherein one of said liquid droplets comprises a fluid reservoir containing particles that is inputted into the EWOD device;
a detector for detecting a property of a liquid droplet dispensed onto the element array; and
a control system configured to perform electrowetting operations by controlling actuation voltages applied to the element array to perform manipulation operations as to liquid droplets present on the element array;
wherein the control system is configured to perform the steps of:
performing an electrowetting operation to dispense a plurality of dispensed droplets from the fluid reservoir, the dispensed droplets having a Poisson distribution of droplets containing a desired number of particles;
interrogating each dispensed droplet with the detector and determining whether each dispensed droplet has the desired number of particles;
selecting dispensed droplets that contain the desired number of particles and performing an electrowetting operation to move the selected dispensed droplets to a reaction area on the EWOD device, the selected dispensed droplets having a non-Poisson distribution of droplets containing the desired number of particles; and
rejecting dispensed droplets that do not contain the desired number of particles and performing an electrowetting operation to move the rejected dispensed droplets to a holding area on the EWOD device that is different and spaced apart from the reaction area.

2. The microfluidic system of claim 1, wherein the control system further is configured to perform an electrowetting operation to merge a portion of the rejected droplets from the holding area back into the fluid reservoir.

3. The microfluidic system of claim 1, further comprising a data logger that records a droplet history of the selected and rejected droplets; and the control system further is configured to perform the steps of:
reading the droplet history from the data logger; and
performing an electrowetting operation based on the droplet history to merge a portion of the rejected droplets from the holding area back into the fluid reservoir to maintain a particle concentration in the fluid reservoir having an increased probability of dispensing droplets with the desired number of particles.

4. The microfluidic system of claim 1, wherein the detector includes a sensor that is external to the element array of the EWOD device.

5. The microfluidic system of claim 1, wherein the detector includes sensing circuitry that is integrated into array element circuitry of each of the array elements of the EWOD device.

6. The microfluidic system of claim 1, wherein the detector includes a sensor configured to interrogate a dispensed droplet by optically observing the droplet, determining an electrical property of the droplet, and/or determining a mass of the droplet.

7. A non-transitory computer-readable medium storing program code which is executed by a processing device for controlling actuation voltages applied to array elements of an element array of an electro-wetting on dielectric (EWOD) device comprising an element array configured to receive liquid droplets, the element array comprising a plurality of individual array elements and wherein one of said liquid droplets comprises a fluid reservoir containing particles that is inputted into the EWOD device;
the program code being executable by the processing device to perform the steps of:
performing an electrowetting operation to dispense a plurality of dispensed droplets from the fluid reservoir, the dispensed droplets having a Poisson distribution of droplets containing a desired number of particles;

interrogating each dispensed droplet with a detector and determining whether each dispensed droplet has the desired number of particles;

selecting dispensed droplets that contain the desired number of particles and performing an electrowetting operation to move the selected dispensed droplets to a reaction area on the EWOD device, the selected dispensed droplets having a non-Poisson distribution of droplets containing the desired number of particles; and rejecting dispensed droplets that do not contain the desired number of particles and performing an electrowetting operation to move the rejected dispensed droplets to a holding area on the EWOD device that is different and spaced apart from the reaction area.

8. The non-transitory computer-readable medium of claim 7, wherein the program code further is executable by the processing device to perform an electrowetting operation to merge a portion of the rejected droplets from the holding area back into the fluid reservoir.

9. The non-transitory computer-readable medium of claim 7, wherein the EWOD device further comprises a data logger that records a droplet history of the selected and rejected droplets; and the program code further is executable by the processing device to perform the steps of:

reading the droplet history from the data logger; and performing an electrowetting operation based on the droplet history to merge a portion of the rejected droplets from the holding area back into the fluid reservoir to maintain a particle concentration in the fluid reservoir having an increased probability of dispensing droplets with the desired number of particles.

\* \* \* \* \*